United States Patent
Lee et al.

(10) Patent No.: US 12,058,443 B2
(45) Date of Patent: Aug. 6, 2024

(54) OPTICAL IMAGE STABILIZATION ACTUATOR AND CAMERA MODULE INCLUDING THE SAME

(71) Applicant: SAMSUNG ELECTRO-MECHANICS CO., LTD., Suwon-si (KR)

(72) Inventors: Kyung Hun Lee, Suwon-si (KR); Gab Yong Kim, Suwon-si (KR); Sung Jae Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 65 days.

(21) Appl. No.: 17/988,843

(22) Filed: Nov. 17, 2022

(65) Prior Publication Data

US 2023/0224586 A1 Jul. 13, 2023

(30) Foreign Application Priority Data

Jan. 13, 2022 (KR) ........................ 10-2022-0005251

(51) Int. Cl.
*H04N 23/68* (2023.01)
*H02K 11/215* (2016.01)
(Continued)

(52) U.S. Cl.
CPC ......... *H04N 23/687* (2023.01); *H02K 11/215* (2016.01); *H02K 41/0354* (2013.01); *H04N 23/54* (2023.01); *G03B 13/36* (2013.01)

(58) Field of Classification Search
CPC .... H04N 23/687; H04N 23/54; H02K 11/215; H02K 41/0354
(Continued)

(56) References Cited

U.S. PATENT DOCUMENTS

2015/0049209 A1* 2/2015 Hwang .................... G02B 7/09
348/208.11
2020/0314338 A1 10/2020 Johnson et al.
(Continued)

FOREIGN PATENT DOCUMENTS

KR 10-2017-0106185 A 9/2017
KR 10-2017-0116925 A 10/2017
(Continued)

OTHER PUBLICATIONS

Korean Office Action issued on Jun. 26, 2023, in counterpart Korean Patent Application No. 10-2022-0005251 (7 pages in English, 5 pages in Korean).

(Continued)

*Primary Examiner* — Joel W Fosselman
(74) *Attorney, Agent, or Firm* — NSIP Law

(57) ABSTRACT

An optical image stabilization actuator is provided. The optical image stabilization actuator includes a sensor substrate on which an image sensor having an imaging plane is disposed; a fixed frame configured to accommodate the sensor substrate; a movable frame accommodated in the fixed frame and configured to move in a direction parallel to the imaging plane; a first ball member disposed between the fixed frame and the movable frame and configured to support movement of the movable frame; and a first driver disposed on the movable frame and the fixed frame and configured to provide driving force to the movable frame, wherein the sensor substrate includes a movable portion coupled to the movable frame, a fixed portion coupled to the fixed frame, and a plurality of bridges configured to movably support the movable portion.

16 Claims, 18 Drawing Sheets

(51) Int. Cl.
*H02K 41/035* (2006.01)
*H04N 23/54* (2023.01)
*G03B 13/36* (2021.01)

(58) Field of Classification Search
USPC .................................................. 348/208.7
See application file for complete search history.

(56) References Cited

U.S. PATENT DOCUMENTS

| | | | |
|---|---|---|---|
| 2021/0250475 A1 | 8/2021 | Jeong et al. | |
| 2021/0271049 A1 | 9/2021 | Seo et al. | |
| 2021/0405321 A1 | 12/2021 | Kwon et al. | |
| 2022/0337753 A1* | 10/2022 | Oh | H04N 23/687 |
| 2022/0390707 A1 | 12/2022 | Park et al. | |
| 2023/0188850 A1 | 6/2023 | Kim et al. | |

FOREIGN PATENT DOCUMENTS

| | | | |
|---|---|---|---|
| KR | 10-2020-0109018 A | | 9/2020 |
| KR | 10-2019-0107739 | * | 3/2021 |
| KR | 10-2279337 B1 | | 7/2021 |
| KR | 10-2021-0101124 A | | 8/2021 |
| KR | 10-2021-0110139 A | | 9/2021 |
| KR | 10-2021-0142955 A | | 11/2021 |
| KR | 10-2022-0000785 A | | 1/2022 |

OTHER PUBLICATIONS

Korean Office Action issued on Apr. 24, 2024, in counterpart Korean Patent Application No. 10-2022-0005251 (4 pages in English, 4 pages in Korean).

* cited by examiner

III-III'

OPTICAL IMAGE STABILIZATION ACTUATOR AND CAMERA MODULE INCLUDING THE SAME

CROSS-REFERENCE TO RELATED APPLICATIONS

This application claims the benefit under 35 USC § 119(a) of Korean Patent Application No. 10-2022-0005251 filed on Jan. 13, 2022, in the Korean Intellectual Property Office, the entire disclosure of which is incorporated herein by reference for all purposes.

BACKGROUND

1. Field

The following description relates to optical image stabilization actuator and a camera module including the same.

2. Description of Related Art

Camera modules are currently being implemented in mobile communication terminals such as, but not limited to, smartphones, tablet personal computers (PCs), and laptops. Additionally, the camera module may include an actuator having a focus adjustment function or operation, and an optical image stabilization (OIS) function or operation to generate a high-resolution image.

For example, a focus may be adjusted by moving a lens module in the optical axis (Z-axis) direction, or shaking may be corrected by moving the lens module in a direction perpendicular to the optical axis (Z-axis) direction.

However, recently, as the performance of camera modules has improved, a weight of the lens module has increased, and due to weight of a driver that moves the lens module, it may be difficult to precisely control the driving force of the image stabilization.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, an optical image stabilization actuator includes a sensor substrate on which an image sensor having an imaging plane is disposed; a fixed frame configured to accommodate the sensor substrate; a movable frame, accommodated in the fixed frame, and configured to move in a direction parallel to the imaging plane; a first ball member disposed between the fixed frame and the movable frame, and configured to support a movement of the movable frame; and a first driver disposed on the movable frame and the fixed frame, and configured to provide a driving force to the movable frame, wherein the sensor substrate comprises a movable portion coupled to the movable frame, a fixed portion coupled to the fixed frame, and a plurality of bridges configured to movably support the movable portion.

The actuator may further include a plurality of magnetic materials disposed on the fixed frame, and configured to generate an attractive force with respect to the first driver disposed on the movable frame.

Guide grooves may be disposed on a surface of the fixed frame and a surface of the movable frame which oppose each other in a direction perpendicular to the imaging plane, respectively, and a size of the guide grooves in a direction parallel to the imaging plane may be greater than a diameter of the first ball member.

The first driver may include a first sub-driver configured to generate a driving force in a first axial direction parallel to the imaging plane, and a second sub-driver configured to generate a driving force in a second axial direction parallel to the imaging plane, the first axial direction and the second axial direction may be perpendicular to each other, the first sub-driver may include a first magnet disposed on the movable frame and a first coil disposed on the fixed frame, and the second sub-driver may include a second magnet disposed on the movable frame and a second coil disposed on the fixed frame.

At least one of the first magnet and the second magnet may include a plurality of magnets spaced apart from each other in a direction perpendicular to a direction in which the driving force is generated.

A plurality of position sensors which oppose the plurality of magnets may be disposed on the fixed frame.

Each of the first magnet and the second magnet may be configured to have an N pole, a neutral region, and an S pole in order in a direction in which the driving force is generated.

The plurality of bridges may be configured to extend along a circumference of the movable portion, and the sensor substrate may include a first support portion configured to connect the plurality of bridges to the fixed portion, and a second support portion configured to connect the plurality of bridges to the movable portion.

The first support portion and the movable portion may be spaced apart from each other, and the second support portion and the fixed portion may be spaced apart from each other.

The first support portion may include two support portions disposed opposite to each other in a first axial direction parallel to the imaging plane, and the second support portion may include two support portions disposed opposite to each other in a second axial direction parallel to the imaging plane, and the first axial direction and the second axial direction may be perpendicular to each other.

The movable frame may include a first escape hole and a second escape hole which penetrate through the movable frame in a direction perpendicular to the imaging plane, and a portion of the fixed portion and a space between the fixed portion and the second support portion may be exposed through the first escape hole and the second escape hole.

In a general aspect, a camera module includes a housing having an internal space; a lens module accommodated in the internal space and configured to move in an optical axis direction; a fixed frame fixed to, and disposed on, the housing; a movable frame configured to move relative to the fixed frame in a direction perpendicular to the optical axis and configured to rotate about the optical axis; a first ball member disposed between the fixed frame and the movable frame, and configured to support a movement of the movable frame; a first driver disposed on the movable frame and the fixed frame, and configured to provide a driving force to the movable frame; and a sensor substrate on which an image sensor is disposed, and comprising a movable portion coupled to the movable frame, a fixed portion coupled to the fixed frame, and a plurality of bridges movably supporting the movable portion.

The first driver may include a first sub-driver configured to generate a driving force in a first axial direction perpendicular to the optical axis, and a second sub-driver configured to generate a driving force in a second axial direction perpendicular to both the optical axis and the first axis, wherein at least one of the first sub-driver and the second sub-driver comprises a plurality of magnets spaced apart from each other in a direction perpendicular to a direction in which driving force is generated, and wherein a plurality of position sensors which oppose the plurality of magnets are disposed on the fixed frame.

The plurality of bridges may be configured to extend along a circumference of the movable portion, and the sensor substrate may include a first support portion configured to connect the plurality of bridges to the fixed portion, and a second support portion configured to connect the plurality of bridges to the movable portion.

The first support portion and the movable portion may be spaced apart from each other, and the second support portion and the fixed portion are spaced apart from each other, and the first support portion may include two support portions disposed opposite to each other in a first axial direction perpendicular to the optical axis, and the second support portion may include two support portions disposed opposite to each other in a second axial direction perpendicular to both the optical axis and the first axis.

The movable frame may include a first escape hole and a second escape hole which penetrate through the movable frame in the optical axis direction, and a space between the fixed portion and the second support portion is exposed through the first escape hole and the second escape hole.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
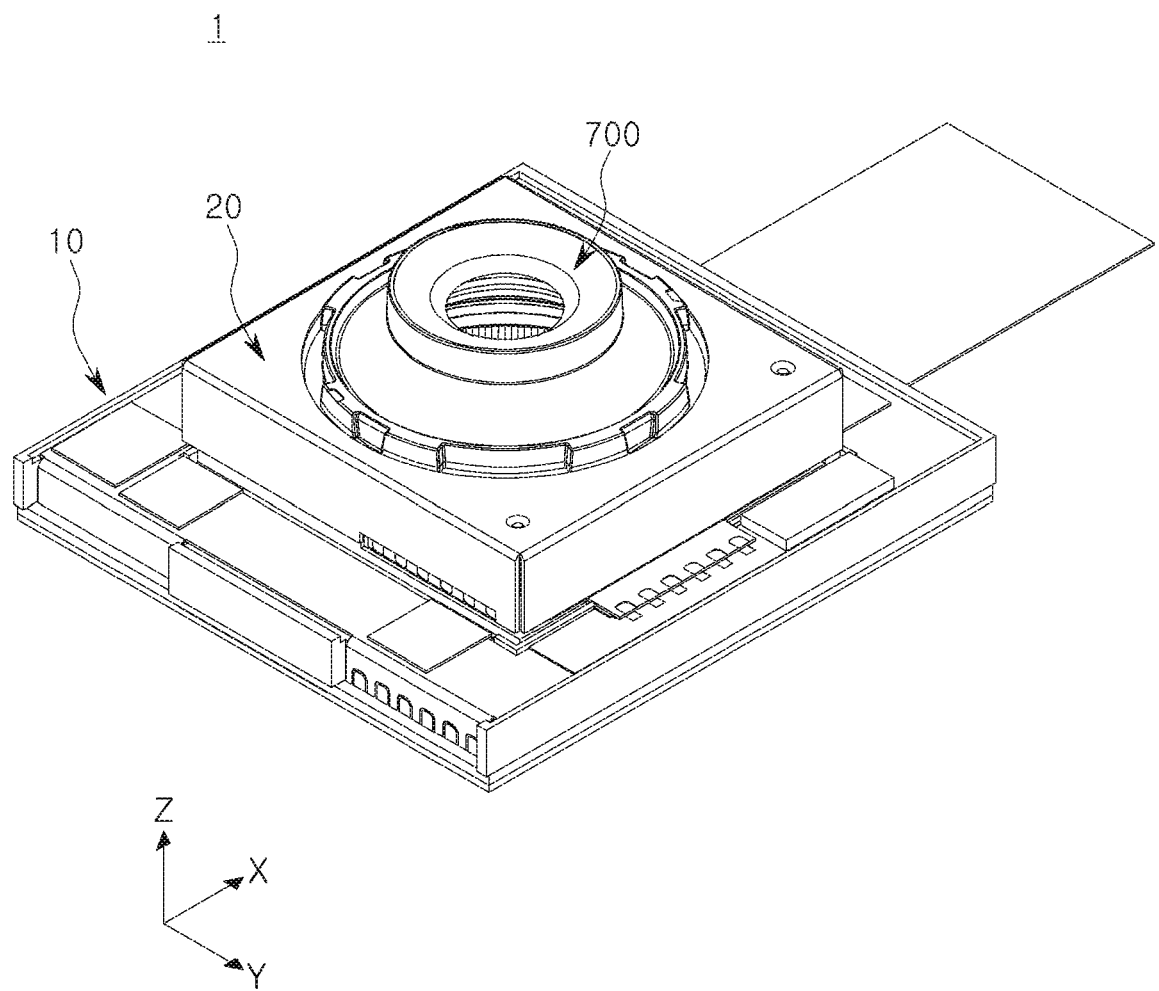
FIG. 1 is a perspective diagram illustrating an example camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

One or more examples may provide a sensor actuator which may improve image stabilization performance and a camera module including the same.

FIG. 1 is a perspective diagram illustrating an example camera module, in accordance with one or more embodiments.

An actuator that performs optical image stabilization and a camera module including the same may be mounted on a portable electronic device. A portable electronic device may be implemented as a portable electronic device such as, but not limited to, a mobile communication terminal, a smartphone, or a tablet PC.

Figure 2:
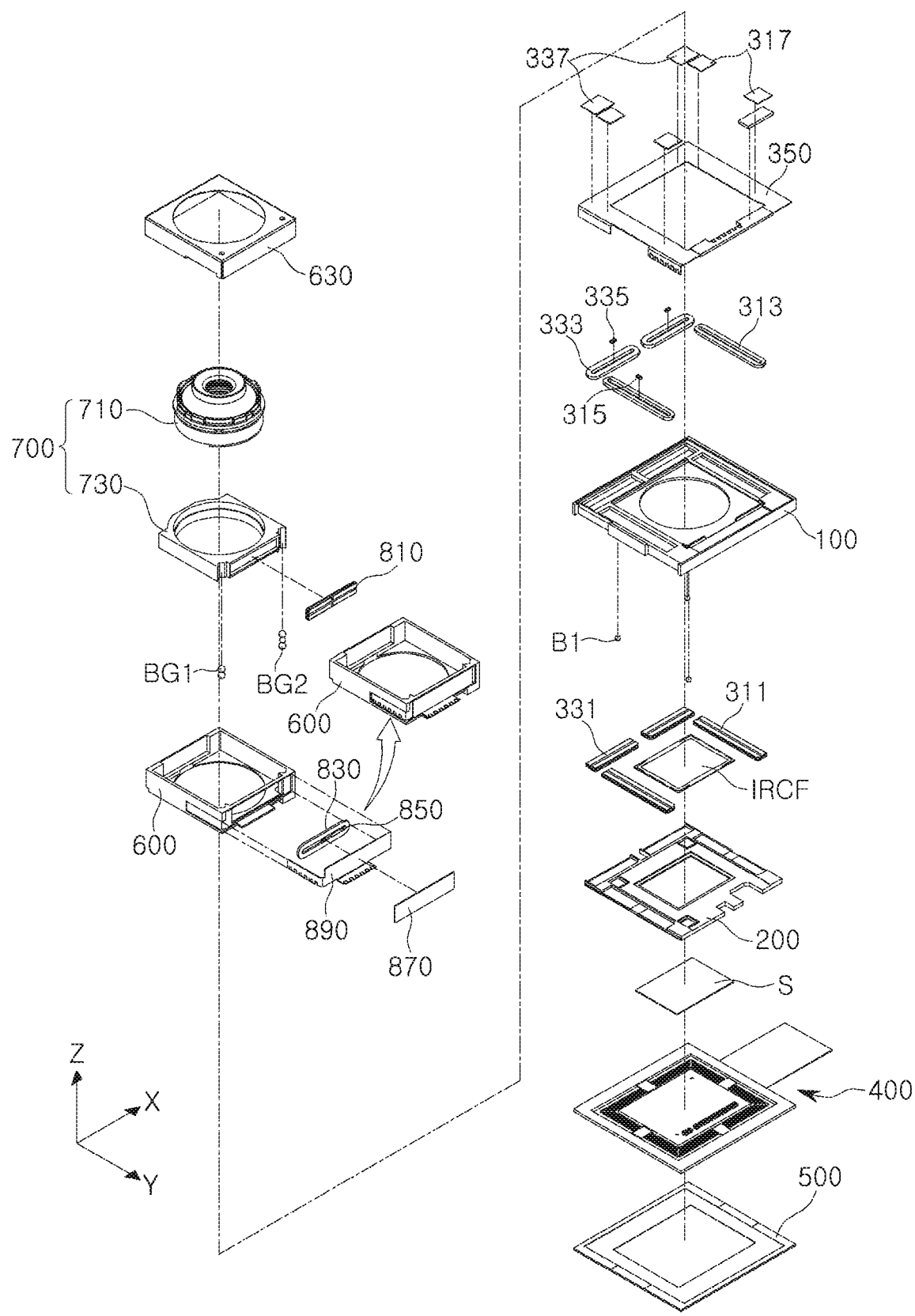
FIG. 2 is an exploded perspective diagram illustrating an example camera module, in accordance with one or more embodiments.

Referring to FIGS. 1 and 2, a camera module 1 in an example embodiment may include a lens module 700, an image sensor S, a first actuator 10 and a second actuator 20.

The first actuator 10 may be an actuator for optical image stabilization, and the second actuator 20 may be an actuator for focus adjustment.

The lens module 700 may include at least one lens and a lens barrel 710. At least one lens may be disposed in the lens barrel 710. When the plurality of lenses L are provided, the plurality of lenses L may be disposed in the lens barrel 710 along the optical axis (Z-axis).

The lens module 700 may further include a carrier 730 coupled to the lens barrel 710.

The carrier 730 may include a hollow portion that penetrates the carrier 730 in the optical axis (Z-axis) direction, and the lens barrel 710 may be inserted into the hollow portion, and may be fixed with respect to the carrier 730.

In an example embodiment, the lens module 700 may be a movable member that moves in the optical axis (Z-axis) direction during automatic focus (AF) adjustment. The camera module 1 in an example embodiment may include a second actuator 20 to perform auto focus adjustment.

The lens module 700 may move in the optical axis (Z-axis) direction based on the second actuator 20 to adjust a focus.

In an example, the lens module 700 may be a fixed member that does not move during optical image stabilization (OIS).

The camera module 1, in an example embodiment, may perform optical image stabilization by moving the image sensor S instead of moving the lens module 700. Since the image sensor S having a relatively light weight is moved, the image sensor S may be moved with a smaller driving force. Accordingly, optical image stabilization may be performed precisely.

Accordingly, the camera module 1 in an example embodiment may include a first actuator 10 that performs optical image stabilization.

Based on an operation by the first actuator 10, the image sensor S may move in a direction perpendicular to the direction in which the imaging plane of the image sensor S is oriented. For example, the image sensor S may move in a direction perpendicular to the optical axis (Z-axis) or may rotate using the optical axis (Z-axis) as a rotation axis and may compensate for shaking.

In the example embodiments, the direction in which the imaging plane of the image sensor S is oriented may be referred to as an optical axis (Z-axis) direction. That is, the image sensor S may move in a direction perpendicular to the optical axis (Z-axis) direction.

In the drawings, the configuration in which the image sensor S moves in a direction parallel to the imaging plane may indicate that the image sensor S may move in a direction perpendicular to the optical axis (Z-axis).

Additionally, the configuration in which the image sensor S moves in the first axial direction (X-axis direction) or the second axial direction (Y-axis direction) may indicate that the image sensor S may move in a direction perpendicular to the optical axis (Z-axis).

The first axial direction (X-direction) and the second axial direction (Y-axis direction) may be examples of two directions perpendicular to the optical axis (Z-axis) and intersecting each other, and in the example embodiments, the first axial direction (X-axis) direction and the second axial direction (Y-axis direction) may be understood as being two directions perpendicular to the optical axis (Z-axis) and intersecting each other.

Figure 3:
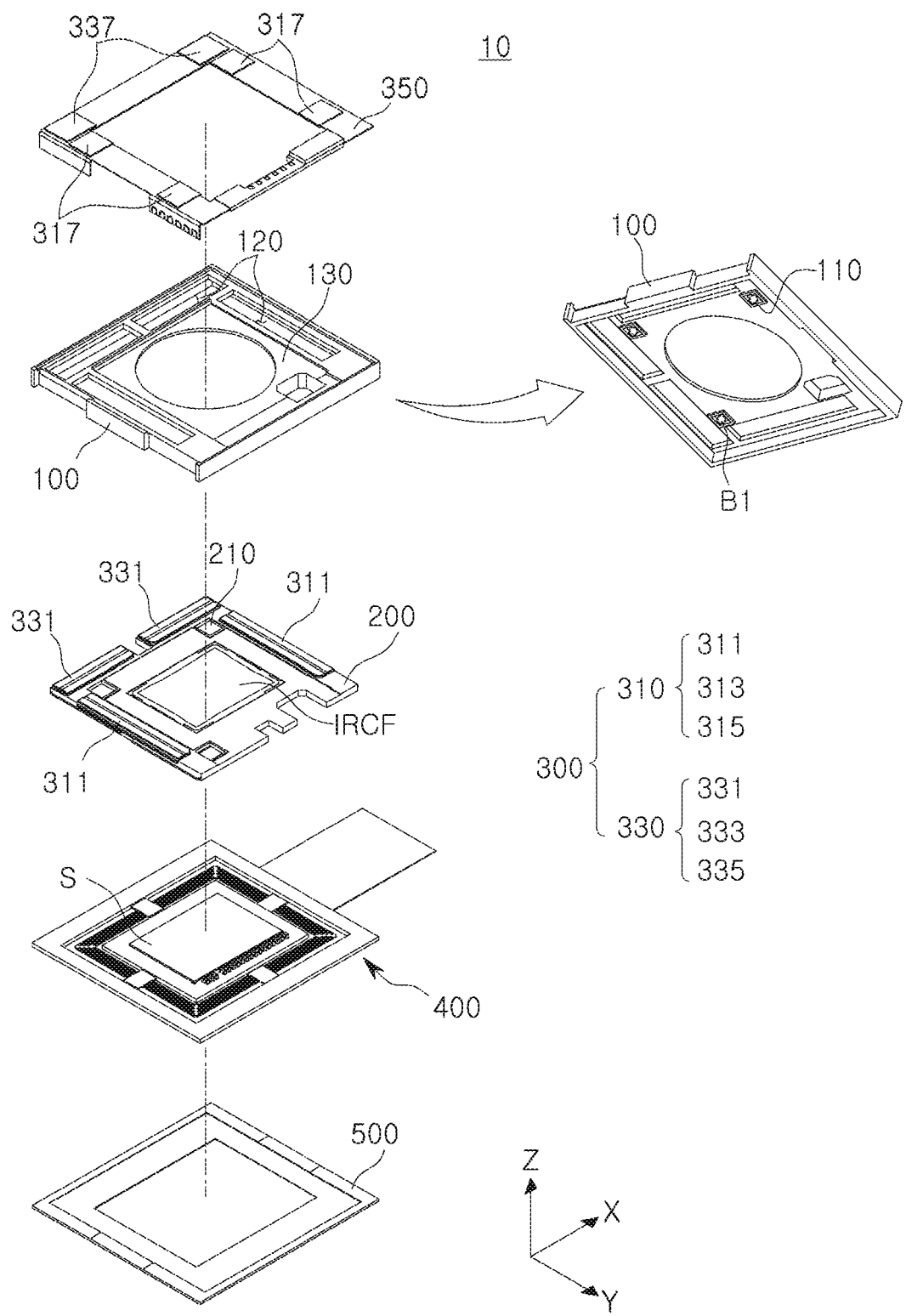
FIG. 3 is an exploded perspective diagram illustrating a first actuator, in accordance with one or more embodiments.
Figure 4:
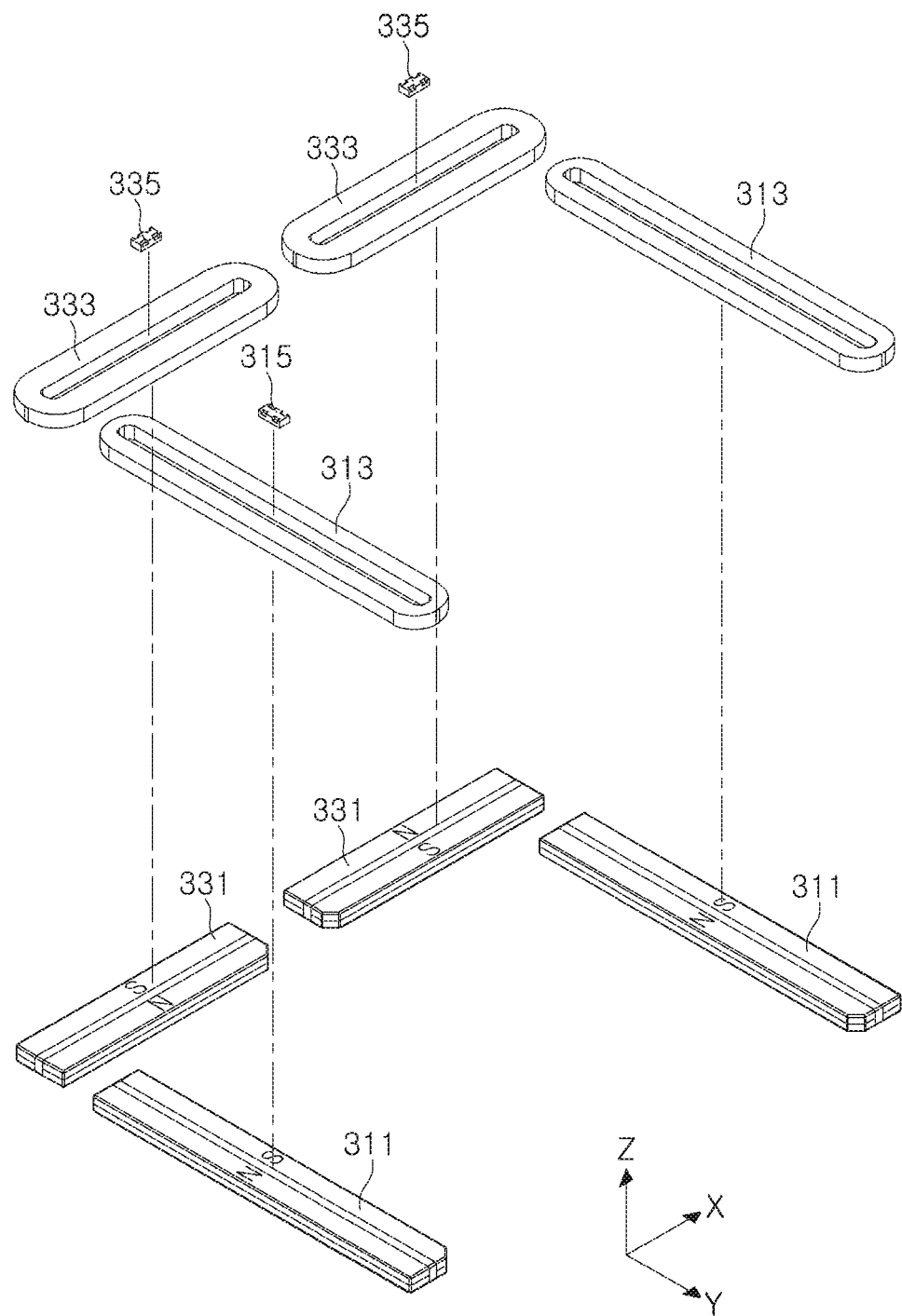
FIG. 4 is an exploded perspective diagram illustrating a first driver of a first actuator, in accordance with one or more embodiments.

FIG. 3 is an exploded perspective diagram illustrating a first actuator 10. FIG. 4 is an exploded perspective diagram illustrating a first driver of the first actuator 10.

Figure 5:
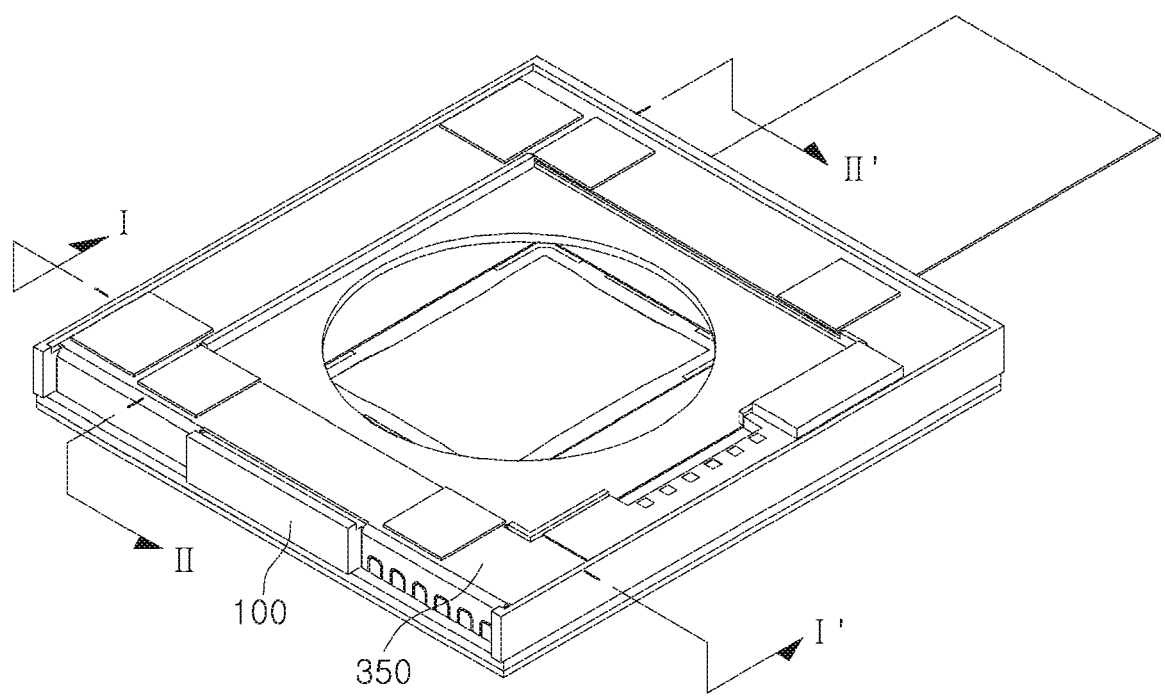
FIG. 5 is a perspective diagram illustrating a first driver, in accordance with one or more embodiments.
Figure 6A:
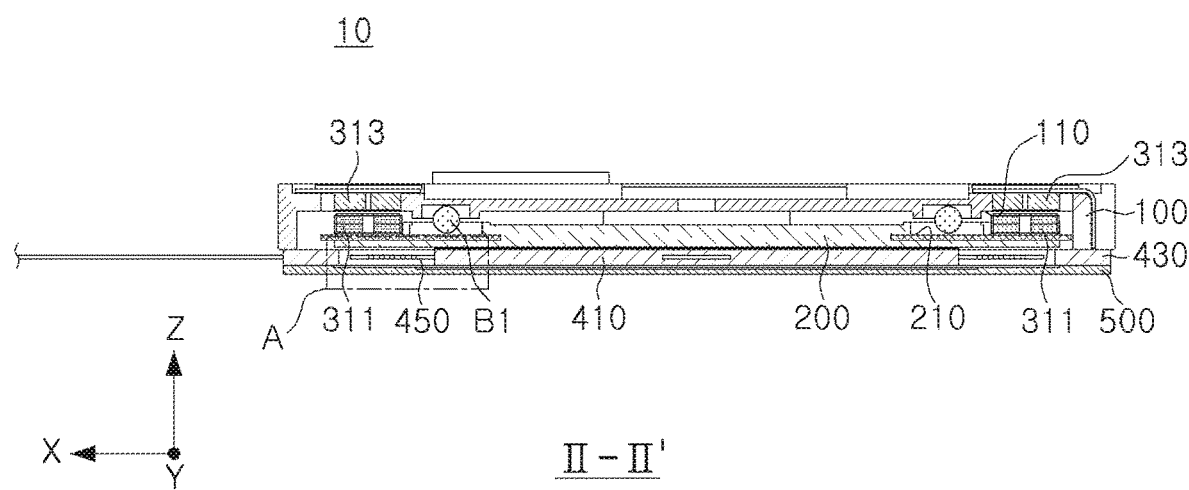
FIG. 6A is a cross-sectional diagram taken along line II-II' in FIG. 5.
Figure 6B:
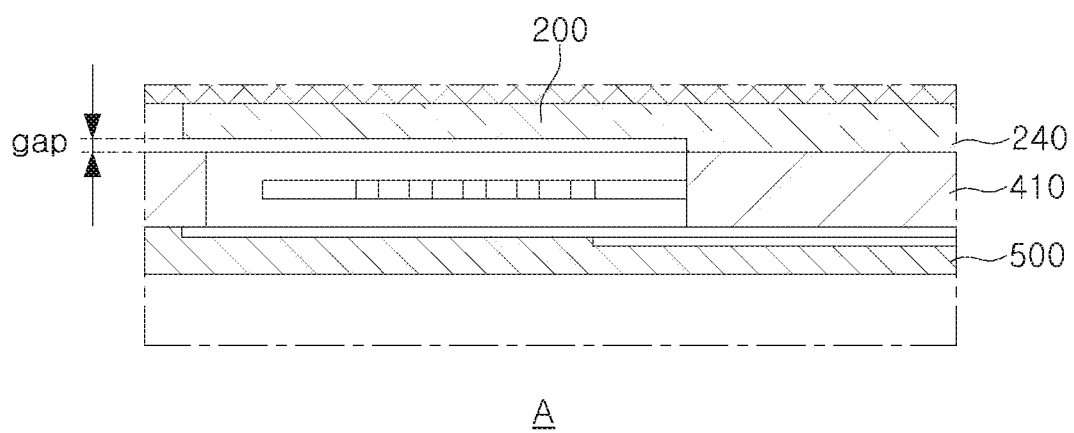
FIG. 6B is an exploded diagram illustrating portion A in FIG. 6A.

FIG. 5 is a perspective diagram illustrating a first driver. FIG. 6A is a cross-sectional diagram taken along line II-II' in FIG. 5. FIG. 6B is an exploded diagram illustrating portion A in FIG. 6A.

Figure 7A:
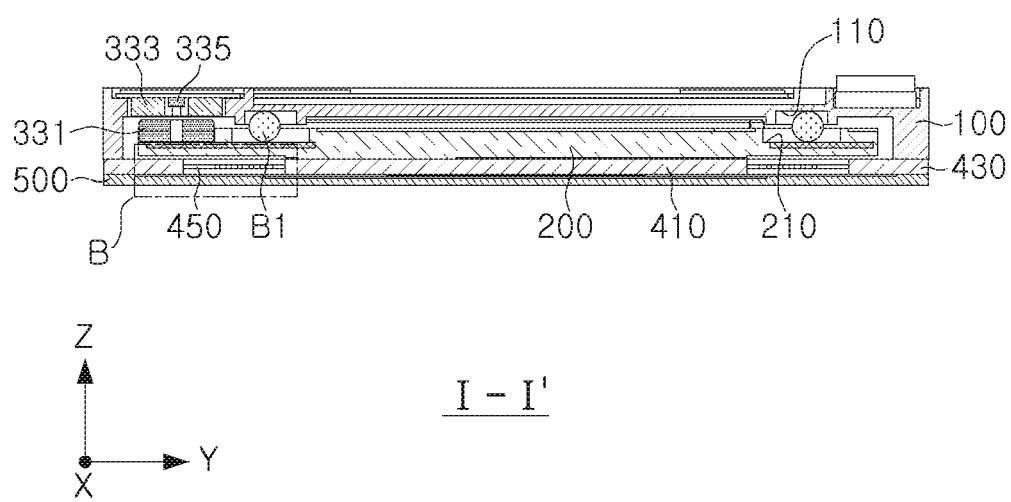
FIG. 7A is a cross-sectional diagram taken along line I-I' in FIG. 5.
Figure 7B:
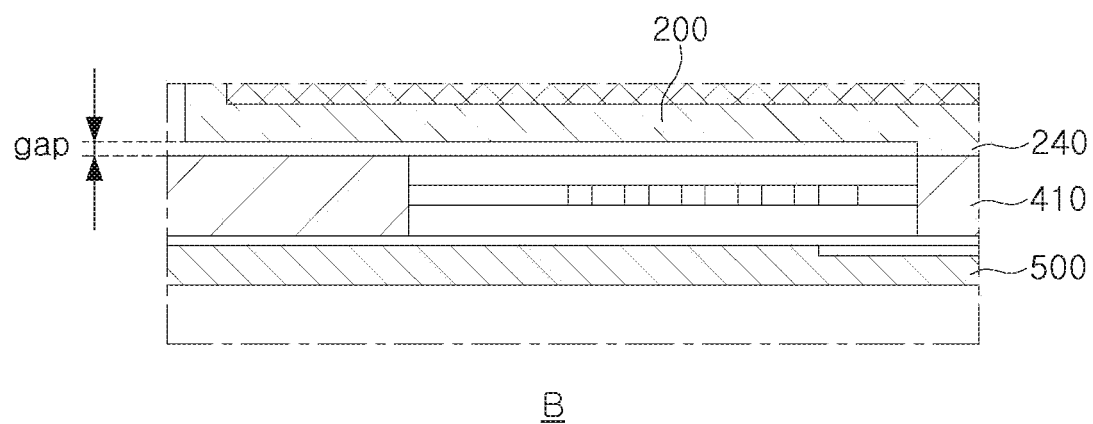
FIG. 7B is an exploded diagram illustrating portion B in FIG. 7A.

FIG. 7A is a cross-sectional diagram taken along line I-I' in FIG. 5. FIG. 7B is an exploded diagram illustrating portion B in FIG. 7A.

Figure 8:
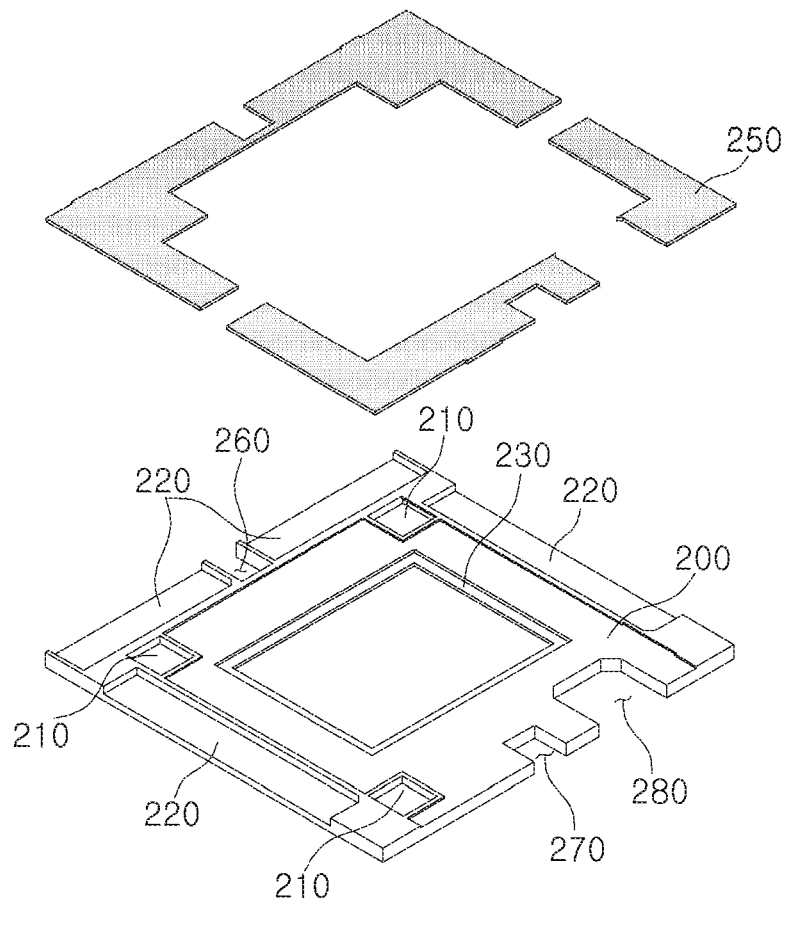
FIG. 8 is a diagram illustrating an example movable frame of a first actuator, in accordance with one or more embodiments.
Figure 8:
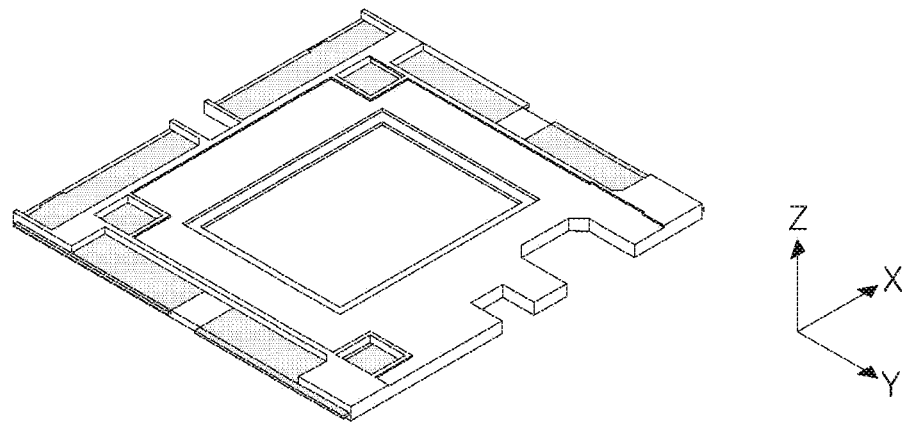
Figure 9:
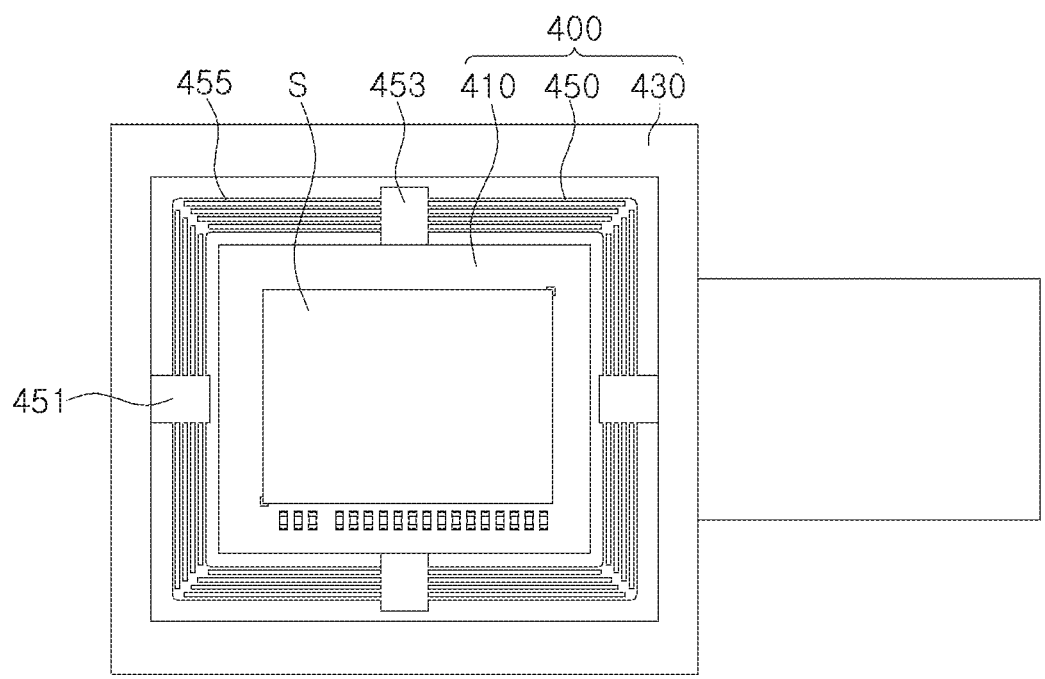
FIG. 9 is a plan diagram illustrating a sensor substrate of a first actuator, in accordance with one or more embodiments.
Figure 9:
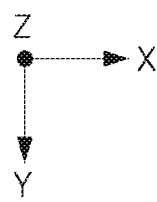
Figure 10:
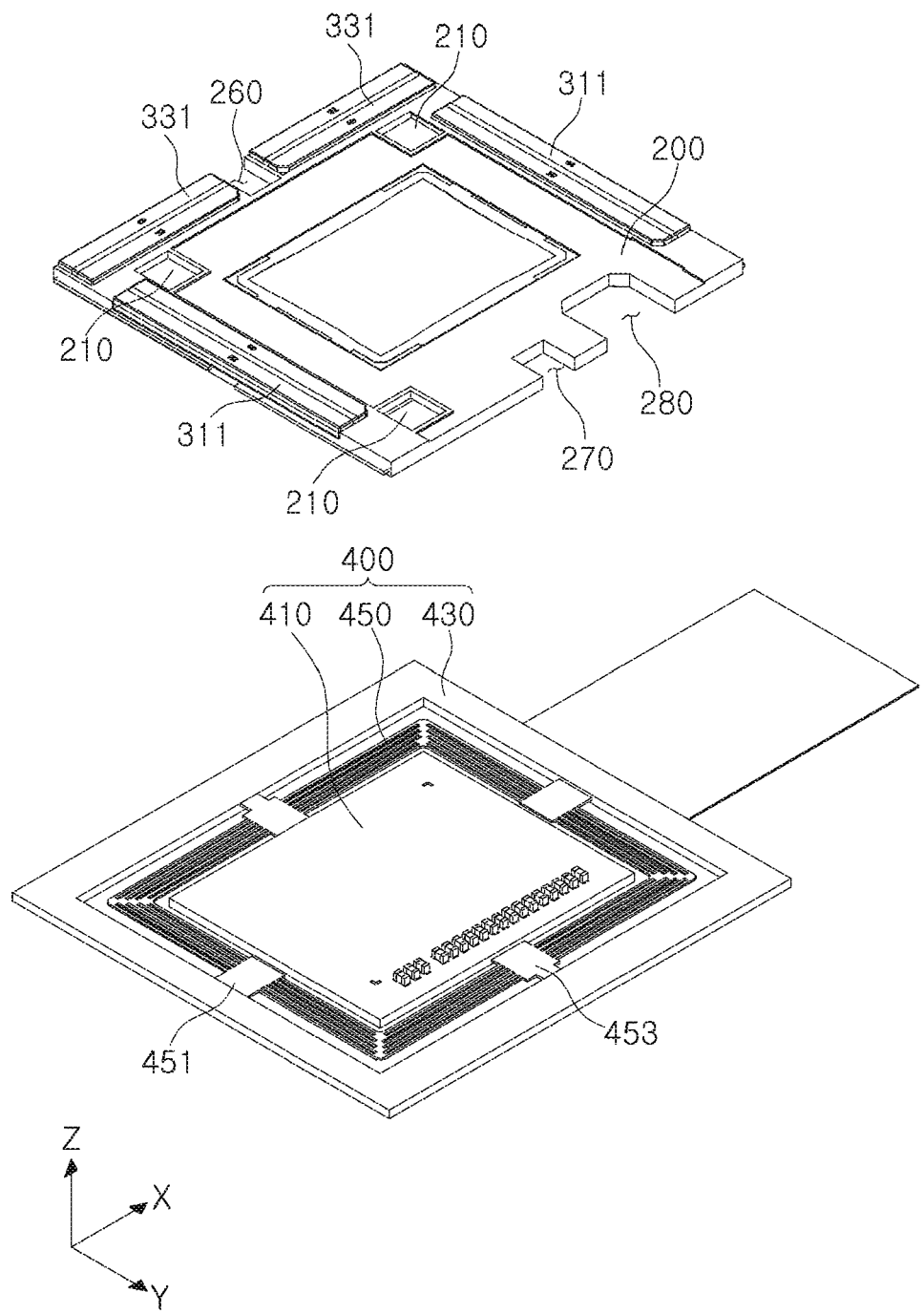
FIG. 10 is a perspective diagram illustrating a moving frame and a sensor substrate of a first actuator, in accordance with one or more embodiments.
Figure 11:
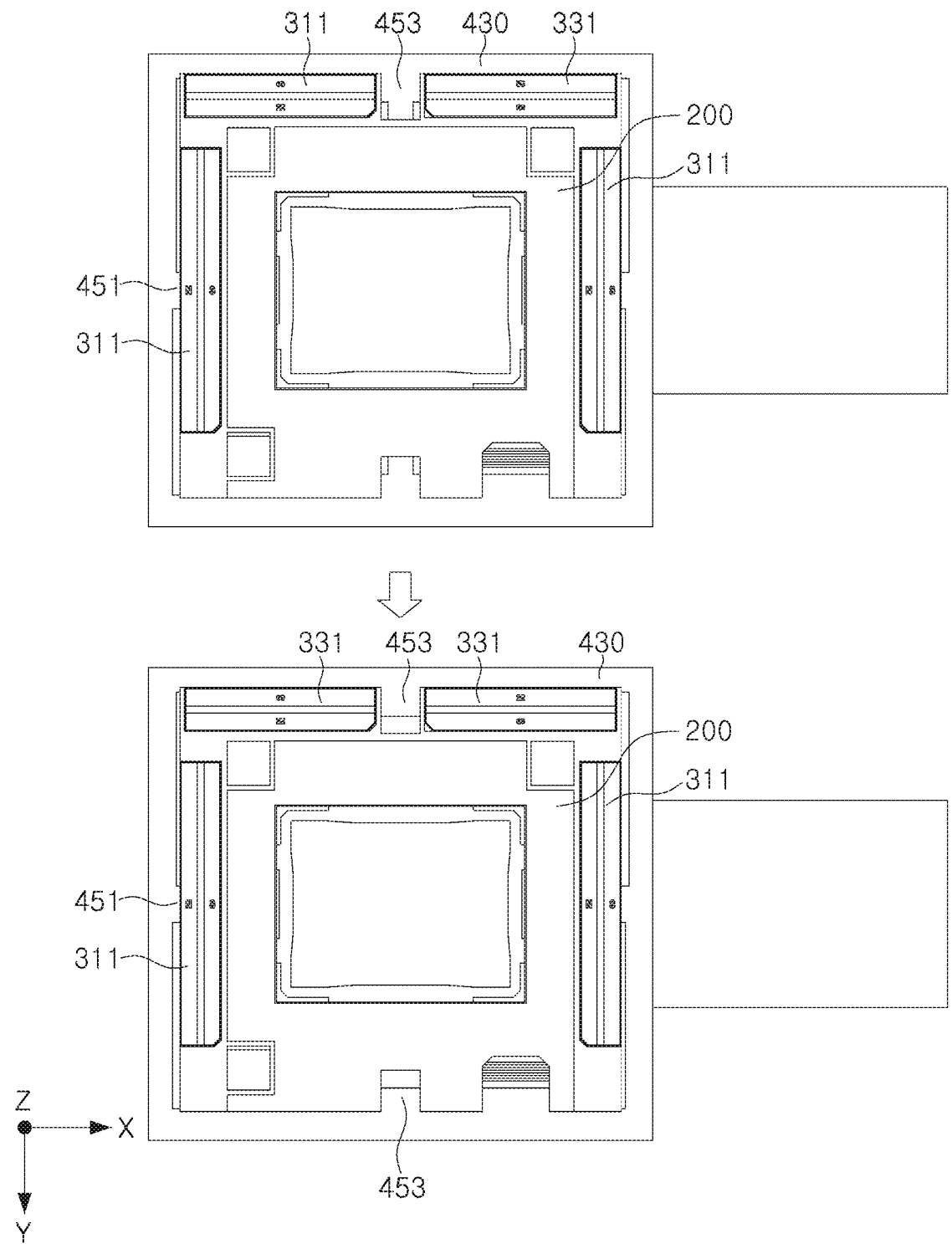
FIG. 11 is a plan diagram illustrating an example in which a moving frame and a sensor substrate of a first actuator are combined with each other.

FIG. 8 is a diagram illustrating an example embodiment of a movable frame of a first actuator. FIG. 9 is a plan diagram illustrating a sensor substrate of a first actuator. FIG. 10 is a perspective diagram illustrating a moving frame and a sensor substrate of a first actuator. FIG. 11 is a plan diagram illustrating an example in which a moving frame and a sensor substrate of a first actuator are combined with each other.

Movement of the image sensor S will be described with reference to FIGS. 3 to 11.

First, referring to FIG. 3, the first actuator 10 may include a fixed frame 100, a movable frame 200, a first driver 300, and a sensor substrate 400, and may further include a base 500.

The fixed frame 100 may be coupled with the second actuator 20 to be described later. For example, the fixed frame 100 may be coupled to the housing 600 of the second actuator 20. A seating groove 130 in which the housing 600 of the second actuator 20 is seated may be provided in the upper surface of the fixed frame 100.

The fixed frame 100 may be a fixed member that does not move during focus adjustment and optical image stabilization.

The fixed frame 100 may have a shape of a square box having an open upper portion and an open lower portion.

The movable frame 200 may be accommodated in the fixed frame 100. The fixed frame 100 may have a sidewall extending downwardly in the optical axis (Z-axis) direction, and accordingly, the fixed frame 100 may have an accommodation space to accommodate the movable frame 200.

The movable frame 200 may move relative to the fixed frame 100 in a direction perpendicular to the optical axis (Z-axis), or may rotate using the optical axis (Z-axis) as a rotation axis. That is, the movable frame 200 may be a movable member moving during optical image stabilization.

For example, the movable frame 200 may be configured to move in a first axis (X-axis) direction and a second axis (Y-axis) direction, and may rotate using an optical axis (Z-axis) as a rotation axis.

The first axis (X-axis) direction may refer to a direction perpendicular to the optical axis (Z-axis), and the second axis (Y-axis) direction may refer a direction perpendicular to both the optical axis (Z-axis) direction and the first axis (X-axis) direction.

The movable frame 200 may have a shape of a square plate having a center penetrated in the optical axis (Z-axis) direction.

An infrared cut-off filter (IRCF) may be mounted on the upper surface of the movable frame 200. A filter mounting groove 230 in which an infrared cut-off filter (IRCF) is mounted may be provided in the upper surface of the movable frame 200 (see FIG. 8). A sensor substrate 400 may be mounted on a lower surface of the movable frame 200.

A first ball member B1 may be disposed between the fixed frame 100 and the movable frame 200.

The first ball member B1 may be disposed to be in contact with the fixed frame 100 and the movable frame 200.

When the movable frame 200 moves or rotates relative to the fixed frame 100, the first ball member B1 may support movement of the movable frame 200 by rolling between the fixed frame 100 and the movable frame 200.

In an example, since the movable frame 200 is accommodated in the fixed frame 100, it may be necessary to reduce the thickness of the movable frame 200 to reduce a height in the optical axis (Z-axis) direction of the first actuator 10.

However, when the thickness of the movable frame 200 is reduced, rigidity of the movable frame 200 may be weakened, such that reliability against external shocks may be reduced.

Accordingly, to reinforce rigidity of the movable frame 200, the movable frame 200 may include a reinforcing plate 250.

For example, referring to FIG. 8, the reinforcing plate 250 may be integrally coupled to the movable frame 200 by insert injection, as only an example. In this example, the reinforcing plate 250 may be integrated with the movable frame 200 by injecting a resin material into a mold while the reinforcing plate 250 is fixed in the mold.

The reinforcing plate 250 may be disposed in the movable frame 200. Additionally, a portion of the reinforcing plate 250 may be exposed externally of the movable frame 200. By exposing a portion of the reinforcing plate 250 externally of the movable frame 200 while the reinforcing plate 250 is integrated with the movable frame 200, the coupling force between the reinforcing plate 250 and the movable frame 200 may improve, and the reinforcing plate 250 may be prevented from being separated from the movable frame 200.

In an example, the reinforcing plate 250 may be a stainless steel material.

The image sensor S may be mounted on the sensor substrate 400. A first portion of the sensor substrate 400 may be coupled to the movable frame 200, and a second portion of the sensor substrate 400 may be coupled to the fixed frame 100.

An image sensor S may be mounted on a portion of the sensor substrate 400 coupled to the movable frame 200.

Since a portion of the sensor substrate 400 may be coupled to the movable frame 200, a portion of the sensor substrate 400 may also move or may rotate together with the movable frame 200 as the movable frame 200 moves or rotates.

Accordingly, the image sensor S may move or may rotate in a plane perpendicular to the optical axis (Z-axis), such that shaking during imaging may be corrected.

The first driver 300 may generate a driving force in a direction perpendicular to the optical axis (Z-axis), and may move the movable frame 200 in a direction perpendicular to the optical axis (Z-axis), or may rotate the movable frame 200 about the optical axis (Z-axis) as a rotation axis.

The first driver 300 may include a first sub-driver 310 and a second sub-driver 330. The first sub-driver 310 may generate a driving force in a first axis (X-axis) direction, and the second sub-driver 330 may generate a driving force in a second axis (Y-axis) direction.

The first sub-driver 310 may include a first magnet 311 and a first coil 313. The first magnet 311 and the first coil 313 may be disposed to oppose each other in the optical axis (Z-axis) direction.

The first magnet 311 may be disposed in the movable frame 200. The first magnet 311 may include a plurality of magnets. For example, the first magnet 311 may include two magnets, and the two magnets may be symmetrically spaced apart from each other with respect to the optical axis (Z-axis). For example, the first magnet 311 may include two magnets spaced apart from each other in a direction (first axis (X-axis) direction) in which driving force is generated by the first magnet 311.

A mounting groove 220 in which the first magnet 311 is disposed may be provided in the upper surface of the movable frame 200 (see FIG. 8). By inserting and disposing the first magnet 311 in the mounting groove 220, an increase in the overall height of the first actuator 10 and the camera module 1 due to the thickness of the first magnet 311 may be prevented.

The first magnet 311 may be magnetized such that a first surface (e.g., a surface opposing the first coil 313) may have both an N pole and an S pole. For example, an N pole, a neutral region, and an S pole may be provided in order on a first surface of the first magnet 311 opposing the first coil 313 in the first axis (X-axis) direction. The first magnet 311 may have a shape having a length in the second axis (Y-axis) direction (see FIG. 4).

A second surface (e.g., the surface opposite to the first surface) of the first magnet 311 may be magnetized to have both an S pole and an N pole. For example, an S pole, a neutral region, and an N pole may be provided on the second surface of the first magnet 311 in order in the first axis (X-axis) direction.

The first coil 313 may be disposed to oppose the first magnet 311. For example, the first coil 313 may be disposed to oppose the first magnet 311 in the optical axis (Z-axis) direction.

In an example, the first coil 313 may have a hollow donut shape, and may have a length in the second axis (Y-axis) direction. The first coil 313 may include a predetermined number of coils corresponding to the number of magnets included in the first magnet 311.

The first coil 313 may be disposed on the first substrate 350. The first substrate 350 may be mounted on the fixed frame 100 such that the first magnet 311 and the first coil 313 may oppose each other in the optical axis (Z-axis) direction.

The fixed frame 100 may include a through hole 120. For example, the through hole 120 may be configured to penetrate the upper surface of the fixed frame 100 in the optical axis (Z-axis) direction. The first coil 313 may be disposed in the through hole 120 of the fixed frame 100. By disposing the first coil 313 in the through hole 120 of the fixed frame 100, an increase in an overall height of the first actuator 10 and the camera module 1 due to the thickness of the first coil 313 may be prevented The upper portion of the through hole 120 of the fixed frame 100 may be covered by the first substrate 350.

The first magnet 311 may be a movable member mounted on the movable frame 200 and moving together with the movable frame 200, and the first coil 313 may be a fixed member fixed to the first substrate 350 and the fixed frame 100.

When power is applied to the first coil 313, the movable frame 200 may move in the first axis (X-axis) direction based on an electromagnetic force between the first magnet 311 and the first coil 313.

The first magnet 311 and the first coil 313 may generate a driving force in a direction (e.g., a first axis (X-axis) direction) perpendicular to a direction (the optical axis direction) in which the first magnet 311 and the first coil 313 oppose each other.

The second sub-driver 330 may include a second magnet 331 and a second coil 333. The second magnet 331 and the second coil 333 may be disposed to oppose each other in the optical axis (Z-axis) direction.

The second magnet 331 may be disposed in the movable frame 200. The second magnet 331 may include a plurality of magnets. For example, the second magnet 331 may include two magnets, and the two magnets may be spaced apart from each other in the first axis (X-axis) direction. For example, the second magnet 331 may include two magnets spaced apart from each other in a direction perpendicular to a direction (second axis (Y-axis) direction) in which driving force is generated by the second magnet 331.

The first magnet 311 and the second magnet 331 may be disposed in a manner that is opposite to the example illustrated in FIG. 4. For example, the first magnet 311 may include two magnets spaced apart from each other in a direction perpendicular to a direction (first axis (X-axis) direction) in which driving force is generated by the first magnet 311, and the second magnet 331 may include two magnets spaced apart from each other in a direction (second axis (Y-axis) direction) in which driving force is generated by the second magnet 331.

Alternatively, both the first magnet 311 and the second magnet 331 may include two magnets spaced apart from each other in a direction perpendicular to a direction in which driving force is generated by each magnet.

A mounting groove 220 in which the second magnet 331 is disposed may be provided in the upper surface of the movable frame 200 (see FIG. 8). By inserting the second magnet 331 in the mounting groove 220, an increase in the overall height of the first actuator 10 and the camera module 1 due to the thickness of the second magnet 331 may be prevented.

The second magnet 331 may be magnetized such that a first surface (e.g., a surface opposing the second coil 333) may have both an S pole and an N pole. For example, an S pole, a neutral region, and an N pole may be provided in order on a first surface of the second magnet 331 opposing the second coil 333 in the second axis (Y-axis) direction (see FIG. 4). The second magnet 331 may have a shape having a length in the first axis (X-axis) direction.

A second surface (e.g., the surface that is opposite to the first surface) of the second magnet 331 may be magnetized to have both an N pole and an S pole. For example, an N pole, a neutral region, and an S pole may be provided on the second surface of the second magnet 331 in order in the second axis (Y-axis) direction.

The second coil 333 may be disposed to oppose the second magnet 331. For example, the second coil 333 may be disposed to oppose the second magnet 331 in the optical axis (Z-axis) direction.

The second coil 333 may have a hollow donut shape, and may have a length in the first axis (X-axis) direction. The second coil 333 may include coils of which the number may correspond to the number of magnets included in the second magnet 331.

The second coil 333 may be disposed on the first substrate 350. The first substrate 350 may be mounted on the fixed frame 100 such that the second magnet 331 and the second coil 333 may oppose each other in the optical axis (Z-axis) direction.

The fixed frame 100 may include a through hole 120. In an example, the through hole 120 may be configured to penetrate the upper surface of the fixed frame 100 in the optical axis direction. The second coil 333 may be disposed in the through hole 120 of the fixed frame 100. By disposing the second coil 333 in the through hole 120 of the fixed frame 100, an increase in an overall height of the first actuator 10 and the camera module 1 due to the thickness of the second coil 333 may be prevented The second magnet 331 may be a movable member that is mounted on the movable frame 200 and moves together with the movable frame 200, and the second coil 333 may be a fixed member that is fixed to the first substrate 350 and the fixed frame 100.

When power is applied to the second coil 333, the movable frame 200 may move in the second axis (Y-axis) direction based on an electromagnetic force between the second magnet 331 and the second coil 333.

The second magnet 331 and the second coil 333 may generate a driving force in a direction (e.g., a second axis (Y-axis) direction) perpendicular to a direction opposing each other (optical axis direction).

In an example, the movable frame 200 may rotate about the optical axis (Z-axis) based on operations by the first sub-driver 310 and the second sub-driver 330.

The first magnet 311 and the second magnet 331 may be disposed perpendicular to each other on a plane perpendicular to the optical axis (Z-axis), and the first coil 313 and the second coil 333 may also be disposed perpendicular to each other on a plane perpendicular to the optical axis (Z-axis).

A first ball member B1 may be disposed between the fixed frame 100 and the movable frame 200.

The first ball member B1 may be disposed to be in contact with the fixed frame 100 and the movable frame 200.

The first ball member B1 may guide movement of the movable frame 200 in the shake compensation process, and may also maintain a gap between the fixed frame 100 and the movable frame 200.

The first ball member B1 may roll in the first axis (X-axis) direction when a driving force in the first axis (X-axis) direction is generated. Accordingly, the first ball member B1 may guide movement of the movable frame 200 in the first axis (X-axis) direction.

Additionally, when a driving force is generated in the second axis (Y-axis) direction, the first ball member B1 may roll in the second axis (Y-axis) direction. Accordingly, the first ball member B1 may guide movement of the movable frame 200 in the second axis (Y-axis) direction.

The first ball member B1 may include a plurality of balls disposed between the fixed frame 100 and the movable frame 200.

Referring to FIG. 3, at least one of the surfaces of the fixed frame 100 and the movable frame 200 opposing each other in the optical axis (Z-axis) direction may include a guide groove in which the first ball member B1 is disposed. A plurality of guide grooves may be provided to correspond to the plurality of balls of the first ball member B1.

In an example, a first guide groove 110 may be provided on a lower surface of the fixed frame 100, and a second guide groove 210 may be provided on an upper surface of the movable frame 200.

The first ball member B1 may be disposed in the first guide groove 110 and the second guide groove 210, and may be inserted to a region between the fixed frame 100 and the movable frame 200.

Each of the first guide groove 110 and the second guide groove 210 may have a rectangular shape or a circular planar shape. The sizes of the first guide groove 110 and the second guide groove 210 may be larger than a diameter of the first ball member B1. For example, cross-sections of the first guide groove 110 and the second guide groove 210 on a plane perpendicular to the optical axis (Z-axis) may have a size greater than a diameter of the first ball member B1.

As long as the size of the first guide groove 110 and the second guide groove 210 is greater than the diameter of the first ball member B1, the specific shape thereof is not limited.

Accordingly, the first ball member B1 may roll in a direction perpendicular to the optical axis (Z-axis) when it is accommodated in the first guide groove 110 and the second guide groove 210.

As illustrated in FIG. 6A, when a driving force is generated in the first axis (X-axis) direction, the movable frame 200 may move in the first axis (X-axis) direction.

Additionally, as illustrated in FIG. 7A, when a driving force is generated in the second axis (Y-axis) direction, the movable frame 200 may move in the second axis (Y-axis) direction.

Additionally, by generating a deviation between the magnitude of the driving force in the first axis (X-axis) direction and the magnitude of the driving force in the second axis (Y-axis) direction, the movable frame 200 may rotate.

Since a portion of the sensor substrate 400 is coupled to the movable frame 200, and the image sensor S is disposed on the sensor substrate 400, eventually, as the movable frame 200 moves, the image sensor S may also move or may rotate.

Referring to FIGS. 6B and 7B, the movable frame 200 may have a protrusion 240 that protrudes toward the sensor substrate 400. For example, the protrusion 240 may be disposed on the lower surface of the movable frame 200, and the protrusion 240 may be coupled to the movable portion 410 of the sensor substrate 400. Accordingly, a gap may be formed between the body of the movable frame 200 and the sensor substrate 400 in the optical axis (Z-axis) direction, and accordingly, when the movable frame 200 moves on the X-Y plane, interference from the sensor substrate 400 may be prevented.

In FIGS. 6B and 7B, the protrusion 240 may be disposed on the lower surface of the movable frame 200, but this is merely an example, and the protrusion 240 may be disposed on the upper surface of the sensor substrate 400.

The first actuator 10 may detect a position in a direction perpendicular to the optical axis (Z-axis) of the movable frame 200.

Accordingly, a first position sensor 315 and a second position sensor 335 may be provided (see FIG. 4). In an example, the first position sensor 315 may be disposed on the first substrate 350 to oppose the first magnet 311, and the second position sensor 335 may be disposed on the first substrate 350 to oppose the second magnet 331. In an example, the first position sensor 315 and the second position sensor 335 may be Hall sensors.

In an example, referring to the example embodiment illustrated in FIG. 4, the second position sensor 335 may include two Hall sensors. For example, the second magnet 331 may include two magnets spaced apart from each other in a direction (first axis (X-axis) direction) perpendicular to the direction (second axis (Y-axis) direction) in which the driving force is generated by the second magnet 331, and the second position sensor 335 may include two Hall sensors opposing the two magnets.

A rotation of the movable frame 200 may be sensed by two Hall sensors opposing the second magnet 331.

A rotational force may be intentionally generated by generating a deviation between the driving force of the first sub driver 310 and the driving force of the second sub driver 330, using resultant force between the first sub-driver 310 and the second sub-driver 330, or using two magnets included in the second sub driver 330.

Since the first guide groove 110 and the second guide groove 210 have a rectangular shape or a circular planar shape larger than the diameter of the first ball member B1, the first ball member B1 disposed between the first guide groove 110 and the second guide groove 210 may roll in a direction perpendicular to the optical axis (Z-axis) without limitations.

Accordingly, the movable frame 200 may rotate about the Z-axis while being supported by the first ball member B1.

Additionally, when rotation is not desired and linear movement is desired, a driving force of the first sub-driver 310 and/or a driving force of the second sub-driver 330 may be controlled to offset the unintentionally generated rotational force.

Referring to FIG. 3, the first actuator 10 may include a first yoke 317 and a second yoke 337. The first yoke 317 and the second yoke 337 may provide an attractive force such that the fixed frame 100 and the movable frame 200 may maintain a contact state with the first ball member B1.

The first yoke 317 and the second yoke 337 may be disposed on the fixed frame 100 via the first substrate 350. For example, the first yoke 317 and the second yoke 337 may be disposed on the first substrate 350, and the first substrate 350 may be coupled to the fixed frame 100.

A first coil 313 and a second coil 333 may be disposed on a first surface of the first substrate 350, and a first yoke 317 and a second yoke 337 may be disposed on a second surface of the first substrate 350.

The first yoke 317 may be disposed to oppose the first magnet 311 in the optical axis (Z-axis) direction. The first yoke 317 may include a plurality of yokes corresponding to twice the number of magnets included in the first magnet 311. For example, each magnet of the first magnet 311 may oppose two yokes in the optical axis (Z-axis) direction. Two yokes opposing one magnet may be spaced apart from each other in the second axis (Y-axis) direction. However, in an example, the first yoke 317 may include a plurality of yokes corresponding to the number of magnets included in the first magnet 311.

The second yoke 337 may be disposed to oppose the second magnet 331 in the optical axis (Z-axis) direction. The second yoke 337 may include a plurality of yokes corresponding to the number of magnets included in the second magnet 331. For example, when the second magnet 331 includes two magnets, the second yoke 337 may include two yokes. The two yokes may be spaced apart from each other in a first axis (X-axis) direction. Alternatively, each magnet of the second magnet 331 may oppose the two yokes in the optical axis direction. In this example, the two yokes opposing one magnet may be spaced apart from each other in the first axis (X-axis) direction.

An attractive force in the optical axis (Z-axis) direction may act between the first yoke 317 and the first magnet 311 and between the second yoke 337 and the second magnet 331.

Accordingly, since the movable frame 200 is pressed in a direction toward the fixed frame 100, the fixed frame 100 and the movable frame 200 may maintain a contact state with the first ball member B1.

The first yoke 317 and the second yoke 337 may be a material that generates an attractive force between the first magnet 311 and the second magnet 331. For example, the first yoke 317 and the second yoke 337 may be configured as a magnetic material.

Referring to FIG. 9, the sensor substrate 400 may include a movable portion 410, a fixed portion 430 and a connection portion 450. In an example, the sensor substrate 400 may be an RF PCB.

The movable portion 410 may include an image sensor S. The movable portion 410 may be coupled to the lower surface of the movable frame 200. For example, the area of the movable portion 410 may be larger than the area of the image sensor S, and the movable portion 410 of the outer portion of the image sensor S may be coupled to the lower surface of the movable frame 200.

The movable portion 410 may be a movable member that moves together with the movable frame 200 during optical image stabilization. The movable portion 410 may be a rigid printed circuit board (PCB).

The fixed portion 430 may be coupled to the lower surface of the fixed frame 100. The fixed portion 430 may be a fixed member that does not move during optical image stabilization. The fixed portion 430 may be a rigid PCB.

The connection portion 450 may be disposed between the movable portion 410 and the fixed portion 430, and may connect the movable portion 410 to the fixed portion 430. The connection portion 450 may be a flexible printed circuit board (PCB). When the movable portion 410 moves, the connection portion 450 disposed between the movable portion 410 and the fixed portion 430 may be bent or deformed.

The connection portion 450 may extend along the circumference of the movable portion 410. The connection portion 450 may include a plurality of slits that penetrate the connection portion 450 in the optical axis direction. The plurality of slits may be disposed such that a distance may be formed between the movable portion 410 and the fixed portion 430. Accordingly, the connection portion 450 may include a plurality of bridge elements 455 spaced apart from each other by the plurality of slits. The plurality of bridge elements 455 may extend along the circumference of the movable portion 410.

The connection portion 450 may include a first support portion 451 and a second support portion 453. The connection portion 450 may be connected to the fixed portion 430 by the first support portion 451. Additionally, the connection portion 450 may be connected to the movable portion 410 by the second support portion 453.

For example, the first support portion 451 may be in contact with, and connected to, the fixed portion 430, and may be spaced apart from the movable portion 410. Additionally, the second support portion 453 may be connected to the movable portion 410 and may be spaced apart from the fixed portion 430.

For example, the first support portion 451 may extend in the first axial direction (X-axis direction) and may connect the plurality of bridges 455 to the fixed portion 430 of the connection portion 450. In an example embodiment, the first support portion 451 may include two support portions disposed opposite to each other in the first axial direction (X-axis direction).

The second support portion 453 may extend in the second axial direction (Y-axis direction) and may connect the plurality of bridges 455 of the connection portion 450 to the movable portion 410. In an example embodiment, the second support portion 453 may include two support portions disposed opposite to each other in the second axial direction (Y-axis direction).

Accordingly, the movable portion 410 may move in a direction perpendicular to the optical axis (Z-axis) or may rotate based on the optical axis (Z-axis) while being supported by the connection portion 450.

In an example embodiment, when the image sensor S moves in the first axial direction (X-axis direction), the plurality of bridges 455 connected to the first support portion 451 may be bent or deformed. Additionally, when the image sensor S moves in the second axial direction (Y-axis direction), the plurality of bridges 455 connected to the second support portion 453 may be bent or deformed. Additionally, when the image sensor S rotates about the optical axis (Z-axis), a plurality of bridges 455 connected to the first support portion 451 and a plurality of bridges 455 connected to the second support portion 453 may be bent or deformed together.

In an example, the base 500 may be coupled to the lower portion of the sensor substrate 400.

The base 500 may be coupled to the sensor substrate 400 to cover the lower portion of the sensor substrate 400. The base 500 may prevent an external foreign object from entering through a gap between the movable portion 410 and the fixed portion 430 of the sensor substrate 400.

Referring to FIGS. 10 and 11, the movable frame 200 may include a first escape hole 260 and a second escape hole 270.

In an example, the first escape hole 260 and the second escape hole 270 may be configured to penetrate through the movable frame 200 in the optical axis (Z-axis) direction.

While the movable frame 200 is coupled to the sensor substrate 400, the first escape hole 260 and the second escape hole 270 may overlap a portion of the fixed portion 430 in the optical axis (Z-axis) direction and a space between the fixed portion 430 and the connection portion 450 of the sensor substrate 400.

That is, when viewed in the optical axis (Z-axis) direction, a portion of the fixed portion 430 and a space between the fixed portion 430 and the connection portion 450 may be exposed.

The connection portion 450 of the sensor substrate 400 may include a first support portion 451 and a second support portion 453. The connection portion 450 may be connected to the fixed portion 430 by the first support portion 451. Additionally, the connection portion 450 may be connected to the movable portion 410 by the second support portion 453.

That is, since the first support portion 451 is spaced apart from the movable portion 410, and the second support portion 453 is spaced apart from the fixed portion 430, the plurality of bridges 455 may support the movable portion 410 while having movability.

In this example, when the plurality of bridges 455 of the connection portion 450 having movability allows the sensor substrate 400 and the movable frame 200 to be coupled to each other, it may be difficult to fix the position of the movable portion 410 supported by the connection portion 450 in the coupling process, which may highly likely lead to assembly defect. Accordingly, when the sensor substrate 400 and the movable frame 200 are coupled to each other, the plurality of bridges 455 of the connection portion 450 may not have movability.

Accordingly, in an example embodiment, one of the first support portion 451 and the second support portion 453 may allow the sensor substrate 400 and the movable frame 200 to be coupled to each other while being connected to the movable portion 410, the fixed portion 430 and the plurality of bridges 455 (see the drawings on the upper side in FIGS. 10 and 11).

In FIGS. 10 and 11, the first support portion 451 may be connected to the fixed portion 430, but may be spaced apart from the movable portion 410, and the second support portion 453 may be connected to the movable portion 410, the fixed portion 430 and the plurality of bridges 455. Accordingly, in this state, the plurality of bridges 455 may not have movability.

After coupling the movable portion 410 to the movable frame 200 of the sensor substrate 400, the portion in which the second support portion 453 and the fixed portion 430 are connected to each other may be exposed through the escape hole 260 and the second escape hole 270.

Accordingly, the portion in which the second support portion 453 and the fixed portion 430 are connected to each other may be cut out through the first escape hole 260 and the second escape hole 270, and accordingly, the movable portion 410 of the sensor substrate 400 may have movability after being coupled to the movable frame 200.

Figure 12:
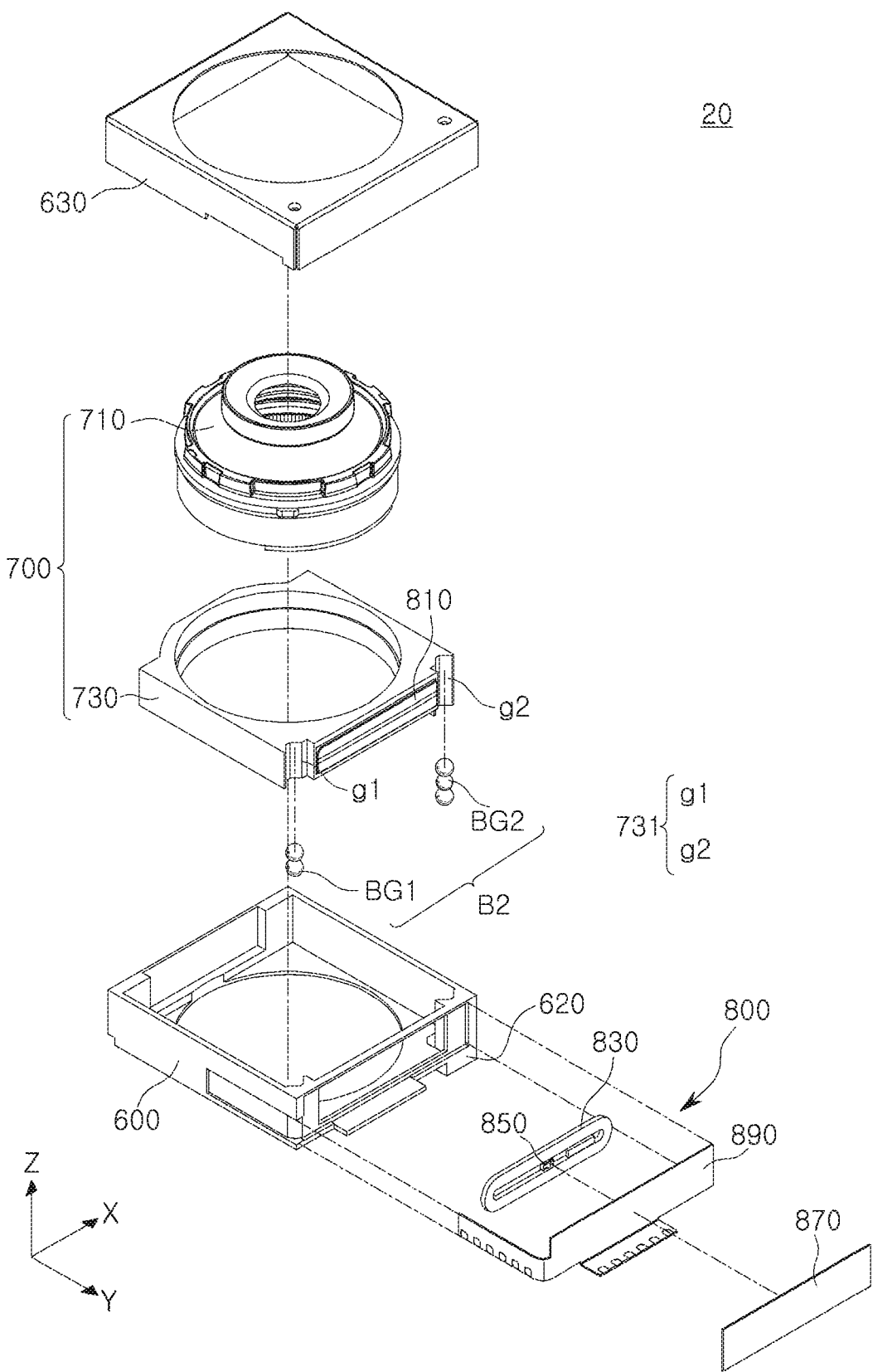
FIG. 12 is an exploded diagram illustrating a second actuator.
Figure 13:
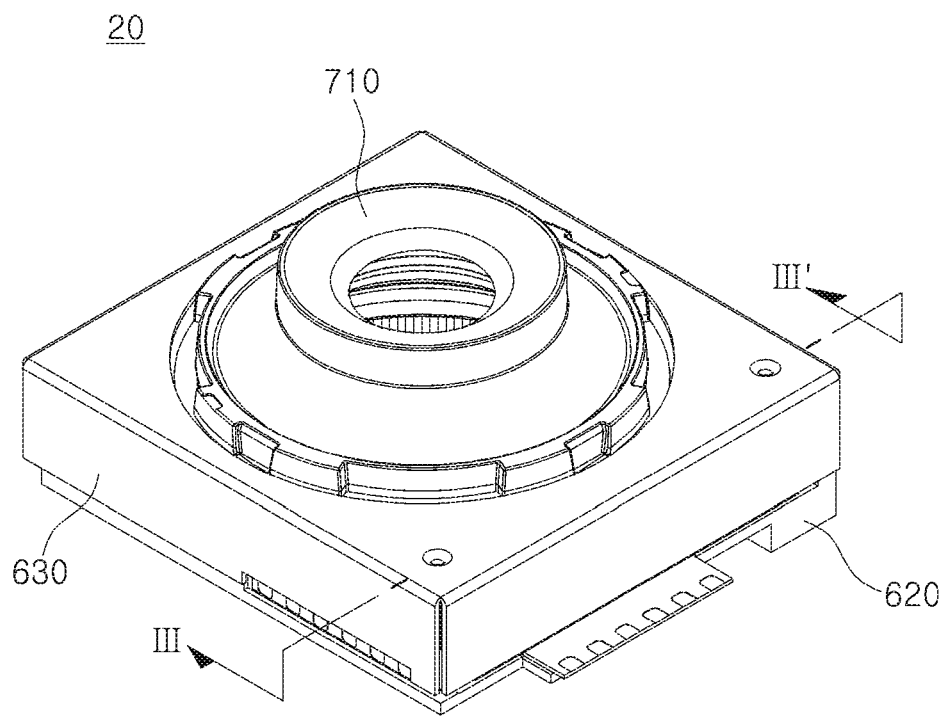
FIG. 13 is a perspective diagram illustrating a second actuator.

FIG. 12 is an exploded diagram illustrating a second actuator 20. FIG. 13 is a perspective diagram illustrating the second actuator 20.

Figure 14:
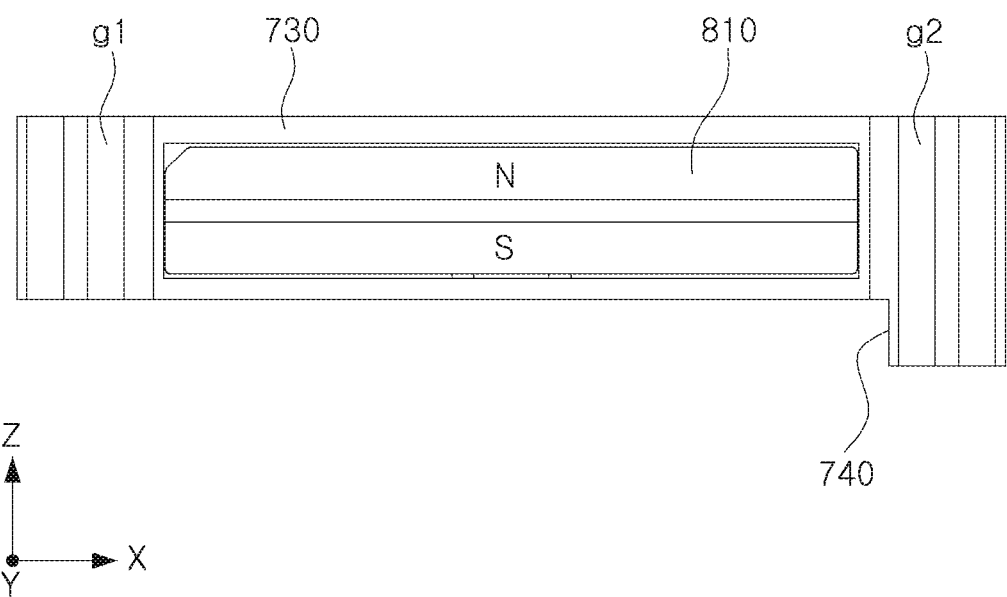
FIG. 14 is a diagram illustrating a carrier of a second actuator.
Figure 15:
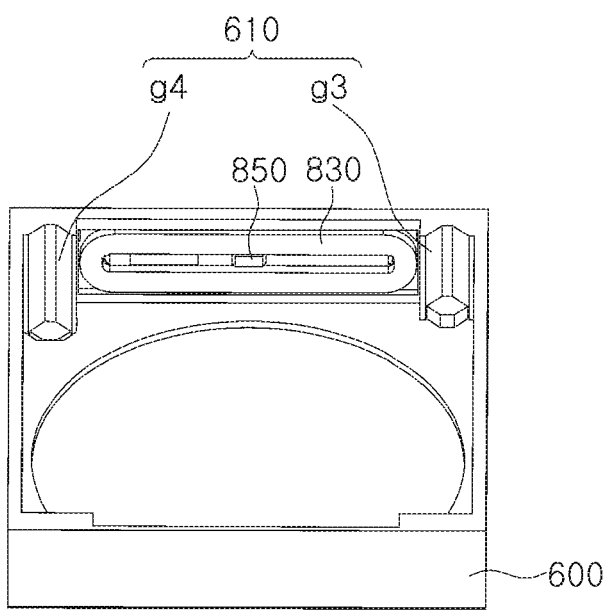
FIG. 15 is a perspective diagram illustrating a housing of a second actuator.
Figure 16:
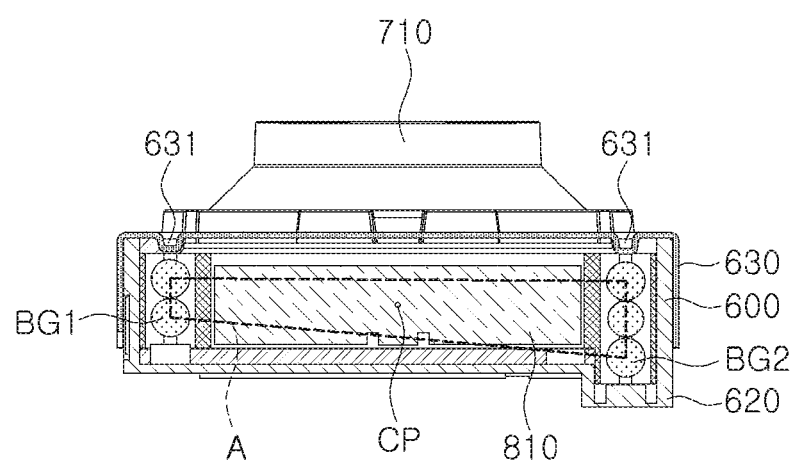
FIG. 16 is a cross-sectional diagram illustrating taken along line III-III' in FIG. 13.

FIG. 14 is a diagram illustrating a carrier of the second actuator 20. FIG. 15 is a perspective diagram illustrating a housing of the second actuator 20. FIG. 16 is a cross-sectional diagram illustrating taken along line III-III' in FIG. 13.

Movement of the carrier 730 in the optical axis (Z-axis) direction will be described with reference to FIGS. 12 to 16.

First, referring to FIG. 12, the second actuator 20 may include a carrier 730, a housing 600, and a second driver 800, and may further include a case 630.

The carrier 730 may include a hollow portion that penetrates the carrier 730 in the optical axis (Z-axis) direction, and the lens barrel 710 may be inserted into the hollow portion and may be fixed with respect to the carrier 730. Accordingly, the lens barrel 710 and the carrier 730 may move together in the optical axis (Z-axis) direction.

The housing 600 may have an internal space, and may have a shape of a square box with an open upper portion and an open lower portion. The carrier 730 may be disposed in the internal space of the housing 600.

The case 630 may be coupled to the housing 600, and may protect the internal components of the second actuator 20.

The case 630 may include a protrusion 631 (FIG. 16) that protrudes toward the second ball member B2. The protrusion 631 may be implemented as a stopper and a buffer member that regulates a movement range of the second ball member B2.

The second driver 800 may generate a driving force in the optical axis (Z-axis) direction, and may move the carrier 730 in the optical axis (Z-axis) direction.

The second driver 800 may include a third magnet 810 and a third coil 830. The third magnet 810 and the third coil 830 may be disposed to oppose each other in a direction perpendicular to the optical axis (Z-axis).

In an example, the third magnet 810 may be disposed on the carrier 730. For example, the third magnet 810 may be disposed on a side surface of the carrier 730.

A back yoke may be disposed between the carrier 730 and the third magnet 810. The back yoke may improve the driving force by preventing a magnetic flux of the third magnet 810 from leaking.

The third magnet 810 may be magnetized such that one surface (e.g., a surface opposing the third coil 830) may have both an N pole and an S pole. For example, an N pole, a neutral region, and an S pole may be provided in order on a first surface of the third magnet 810 opposing the third coil 830 in the optical axis (X-axis) direction.

A second surface (e.g., the opposite surface of the first surface) of the third magnet 810 may be magnetized to have both an S pole and an N pole. For example, an S pole, a neutral region, and an N pole may be provided in order on the second surface of the third magnet 810 in the optical axis (X-axis) direction.

The third coil 830 may be disposed to oppose the third magnet 810. For example, the third coil 830 may be disposed to oppose the third magnet 810 in a direction perpendicular to the optical axis (Z-axis).

The third coil 830 may be disposed on the second substrate 890, and the second substrate 890 may be mounted on the housing 600 such that the third magnet 810 and the third coil 830 may oppose each other in a direction perpendicular to the optical axis (Z-axis).

The third magnet 810 may be a movable member mounted on the carrier 730 and moving in the optical axis (Z-axis) direction together with the carrier 730, and the third coil 830 may be a fixed member fixed to the second substrate 890.

When power is applied to the third coil 830, the carrier 730 may move in the optical axis (Z-axis) direction based on electromagnetic forces between the third magnet 810 and the third coil 830.

Since the lens barrel 710 is disposed on the carrier 730, the lens barrel 710 may also move in the optical axis (Z-axis) direction based on a movement of the carrier 730.

A second ball member B2 may be disposed between the carrier 730 and the housing 600. The second ball member B2 may include a plurality of balls disposed in the optical axis (Z-axis) direction. The plurality of balls may roll in the optical axis (Z-axis) direction when the carrier 730 moves in the optical axis (Z-axis) direction.

The third yoke 870 may be disposed on the housing 600. The third yoke 870 may be disposed in a position opposing the third magnet 810. For example, the third coil 830 may be disposed on one surface of the first substrate 350, and the third yoke 870 may be disposed on the other surface of the first substrate 350.

The third magnet 810 and the third yoke 870 may generate attractive forces therebetween. For example, attractive forces may act between the third magnet 810 and the third yoke 870 in a direction perpendicular to the optical axis (Z-axis).

The second ball member B2 may be in contact with the carrier 730 and the housing 600, respectively, based on an attractive force between the third magnet 810 and the third yoke 870.

Guide grooves may be disposed on the surface of the carrier 730 and the housing 600 opposing each other. For example, a third guide groove 731 may be provided in the carrier 730, and a fourth guide groove 610 may be provided in the housing 600.

The third guide groove 731 and the fourth guide groove 610 may extend in the optical axis (Z-axis) direction. The second ball member B2 may be disposed between the third guide groove 731 and the fourth guide groove 610.

The third guide groove 731 may include a first groove g1 and a second groove g2, and the fourth guide groove 610 may include a third groove g3 and a fourth groove g4. Each groove may extend to have a length in the optical axis (Z-axis) direction.

The first groove g1 and the third groove g3 may be disposed to oppose each other in a direction perpendicular to the optical axis (Z-axis) direction, and a portion (e.g., a first ball group BG1) of the plurality of balls of the second ball member B2 may be disposed in the space between the first groove g1 and the third groove g3.

In an example, the first ball group BG1 may be in contact with the first groove g1 and the third groove g3 at three points. For example, the first ball group BG1 may be in contact with the first groove g1 at one point and may be in contact with the third groove g3 at two points (and vice versa). The first ball group BG1, the first groove g1, and the third groove g3 may function as auxiliary guides.

Additionally, the second groove g2 and the fourth groove g4 may be disposed to oppose each other in a direction perpendicular to the optical axis (Z-axis) direction, and the other ball (e.g., a second ball group BG2) of the plurality of balls of the second ball member B2 may be disposed between the second groove g2 and the fourth groove g4.

In an example, the second ball group BG2 may be in contact with the second groove g2 and the fourth groove g4 at four points. For example, the second ball group BG2 may be in contact with the second groove g2 at two points and may be in contact with the fourth groove g4 at two points. The second ball group BG2, the second groove g2, and the fourth groove g4 may function as main guides.

The second ball member B2 may include a first ball group BG1 and a second ball group BG2, and each of the first ball group BG1 and the second ball group BG2 may include a plurality of balls disposed in the optical axis (Z-axis) direction.

The first ball group BG1 and the second ball group BG2 may be spaced apart from each other in a direction (e.g., the X-axis direction) perpendicular to the optical axis (Z-axis). In a non-limiting example, the number of balls in the first ball group BG1 may be different from the number of balls in the second ball group BG2 (see FIG. 12). However, this is only an example, and in an example, the number of balls in the first group BG1 may be equal to the number of balls in the second group BG2.

For example, the first ball group BG1 may include two or more balls disposed in the optical axis (Z-axis) direction, and the second ball group BG2 may include three balls disposed in the optical axis (Z-axis) direction.

However, the number of balls included in each ball group is not limited to the above example, and the number of balls included in the first ball group BG1 and the number of balls included in the second ball group BG2 may be different and may be varied. Hereinafter, for ease of description, an example embodiment in which the first ball group BG1 may include two balls and the second ball group BG2 may include three balls will be described.

Referring to FIG. 16, the two balls of the first ball group BG1 may have the same diameter. For example, the two balls of the first ball group BG1 may have a first diameter.

In the second ball group BG2, the two balls disposed in the outermost region in the optical axis (Z-axis) direction may have the same diameter, and the ball disposed therebetween may have a diameter greater than a diameter of the ball disposed in the outermost region. For example, in the second ball group BG2, two balls disposed in the outermost region in the optical axis (Z-axis) direction may have a second diameter, one ball disposed therebetween may have a third diameter, and the second diameter may be greater than the third diameter.

Additionally, the first diameter of the two balls of the first ball group BG1, and the second diameter of the two balls in the second ball group BG2 disposed in the outermost region in the optical axis (Z-axis) direction, may be the same. In an example, the same diameter may indicate that the diameters may be physically the same, and may also include manufacturing errors.

The distance between the centers of the two balls of the first ball group BG1 may be different from the distance between the centers of the two balls disposed in the outermost region in the optical axis direction among the plurality of balls of the second ball group BG2. For example, the distance between the centers of two balls of the second ball group BG2 having a second diameter may be greater than the distance between the centers of two balls of the first ball group BG1 having a first diameter.

To move the carrier 730 in a direction parallel to the optical axis (Z-axis) direction when the carrier 730 moves in the optical axis (Z-axis) direction (that is, to prevent tilting), the center point CP of the attractive force acting between the third magnet 810 and the third yoke 870 may need to be disposed in a support region A connecting the contact points of the second ball member B2 to the carrier 730 or the housing 600.

When the center of gravity of the center point CP of the attractive force acting between the third magnet 810 and the third yoke 870 is deviated from the support region A, the position of the carrier 730 may be shifted while the carrier 730 moves, such that tilting may occur. Accordingly, it may be necessary to form the support region A as wide as possible.

In an example embodiment, the size (e.g., a diameter) of a portion of the plurality of balls of the second ball member B2 may be configured to be smaller than the size (e.g., a diameter) of the other balls. In this example, balls having a large size among the plurality of balls may be intentionally allowed to be in contact with the carrier 730 or the housing 600.

Referring to FIG. 16, since the two balls of the first ball group BG1 may have the same diameter, the first ball group BG1 may be in contact with the carrier 730 (or the housing 600) at two points. Additionally, since the diameter of two balls among the three balls of the second ball group BG2 may be larger than the diameter of the other ball, the second ball group BG2 may be in contact with the carrier 730 or the housing 600 at two points.

Accordingly, the second ball member B2 including the first ball group BG1 and the second ball group BG2 may be in contact with the carrier 730 (or the housing 600) at four points. Additionally, the support region A connecting the contact points to each other may have a rectangular shape (e.g., a trapezoidal shape).

Accordingly, the support region A may be configured to be relatively wide, and accordingly, the center point CP of the attractive force acting between the third magnet 810 and the third yoke 870 may be stably positioned in the support region A. Therefore, driving stability at the time of focus adjustment may be ensured.

In an example, during focus adjustment, the plurality of balls of the first ball group BG1 and the plurality of balls of the second ball group BG2 may roll in the optical axis (Z-axis) direction. Accordingly, the size of the support region A may change according to the movement of the balls included in each ball group. In this example, there is a fear that the center of gravity of the center point CP of the attractive force acting between the third magnet 810 and the third yoke 870 may unexpectedly deviate from the support region A during driving.

In an example embodiment, lengths of the first groove g1 and the second groove g2 in the optical axis (Z-axis) direction may be configured differently. For example, the length of the second groove g2 in the optical axis (Z-axis) direction may be longer than the length of the first groove g1 in the optical axis (Z-axis) direction.

Referring to FIG. 14, the second groove g2 may protrude from the lower surface of the carrier 730 in the optical axis (Z-axis) direction. For example, the first extension portion 740 that protrudes downwardly in the optical axis (Z-axis) direction may be disposed on the lower surface of the carrier 730. In an example, the length of the second groove g2 may be longer than the length of the first groove g1 based on the first extension portion 740.

Additionally, in an example, the lengths of the third groove g3 and the fourth groove g4 in the optical axis (Z-axis) direction may be different. For example, the length of the fourth groove g4 in the optical axis (Z-axis) direction may be longer than the length of the third groove g3 in the optical axis (Z-axis) direction.

Referring to FIGS. 12 and 16, the fourth groove g4 may protrude from the lower surface of the housing 600 in the optical axis (Z-axis) direction. For example, the second extension portion 620 that protrudes downwardly in the optical axis (Z-axis) direction may be disposed on the lower surface of the housing 600. The length of the fourth groove g4 may be longer than the length of the third groove g3 based on the second extension portion 620.

In an example embodiment, the number of the plurality of balls included in the first ball group BG1 and the number of the plurality of balls included in the second ball group BG2 may be configured differently, and lengths of the space in the optical axis (Z-axis) direction in which each ball group is accommodated may be configured differently, such that the size of the support region A may be prevented from being changed, or even when the size of the support region A is changed, the center point CP of the attractive force acting between the third magnet 810 and the third yoke 870 may not be deviated from the support region A.

Additionally, in the main guide and the auxiliary guide, the lengths of the second groove g2 and the fourth groove g4 corresponding to the main guides may be configured to be longer than the lengths of the first groove g1 and the third groove g3, the size of the support region A may be increased.

Additionally, an escape region may be provided in the fixed frame 100 and the movable frame 200 of the first actuator 10 to secure a space in which the first extension portion 740 and the second extension portion 620 may protrude.

That is, the fixed frame 100 may include a first accommodation hole 140 that penetrates the fixed frame 100 in the optical axis (Z-axis) direction, and the movable frame 200 may include a second accommodation hole 280 that penetrates the movable frame 200 in the optical axis (Z-axis) direction, and the first accommodation hole 140 and the second accommodation hole 280 may be disposed in a region overlapping in the optical axis (Z-axis) direction.

When the first actuator 10 and the second actuator 20 are coupled to each other, the first extension portion 740 and the second extension portion 620 may be disposed in the first accommodation hole 140 and the second accommodation hole 280. Since the movable frame 200 is configured to move in the X-Y plane, the size of the second accommodation hole 280 in the X-Y plane may be greater than the size of the first extension portion 740 and the second extension portion 620 in consideration of the amount of movement of the movable frame 200.

Accordingly, in the second actuator 20, even when the first extension portion 740 protrudes from the lower surface of the carrier 730, and the second extension portion 620 protrudes from the lower surface of the housing 600, as the protruding portion is disposed in the first actuator 10, the height of the entire camera module 1 may not be increased.

In an example, the second actuator 20 may sense the position of the carrier 730 in the optical axis (Z-axis) direction.

In an example, a third position sensor 850 may be provided (see FIG. 12). The third position sensor 850 may be disposed on the second substrate 890 to oppose the third magnet 810. The third position sensor 850 may be a Hall sensor.

The camera module 1 in an example embodiment may be configured such that the lens module 700 may move in the optical axis (Z-axis) direction during automatic focus adjustment, and the image sensor S may be configured to move in a direction perpendicular to the optical axis (Z-axis) during optical image stabilization.

Accordingly, even when the lens module 700 moves in the optical axis (Z-axis) direction during focus adjustment, relative positions of the magnets and coils of the first driver 300 may not change, such that the driving force for optical image stabilization may be precisely controlled.

Additionally, even when the image sensor S moves in the direction perpendicular to the optical axis during optical image stabilization, since the relative positions of the magnet and the coil of the second driver 800 may not change, such that the driving force for focus adjustment may be precisely controlled.

According to the aforementioned example embodiments, an actuator for optical image stabilization and a camera module including the same may improve optical image stabilization performance.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical image stabilization actuator, the actuator comprising:
    a sensor substrate on which an image sensor having an imaging plane is disposed;
    a fixed frame configured to accommodate the sensor substrate;
    a movable frame, accommodated in the fixed frame, and configured to move in a direction parallel to the imaging plane;
    a first ball member disposed between the fixed frame and the movable frame, and configured to support a movement of the movable frame; and
    a first driver disposed on the movable frame and the fixed frame, and configured to provide a driving force to the movable frame,
    wherein the sensor substrate comprises a movable portion coupled to the movable frame, a fixed portion coupled to the fixed frame, and a plurality of bridges configured to movably support the movable portion.

2. The actuator of claim 1, further comprising:
    a plurality of magnetic materials disposed on the fixed frame, and configured to generate an attractive force with respect to the first driver disposed on the movable frame.

3. The actuator of claim 1,
    wherein guide grooves are disposed on a surface of the fixed frame and a surface of the movable frame which oppose each other in a direction perpendicular to the imaging plane, respectively, and
    wherein a size of the guide grooves in a direction parallel to the imaging plane is greater than a diameter of the first ball member.

4. The actuator of claim 1,
    wherein the first driver comprises a first sub-driver configured to generate a driving force in a first axial direction parallel to the imaging plane, and a second sub-driver configured to generate a driving force in a second axial direction parallel to the imaging plane,
    wherein the first axial direction and the second axial direction are perpendicular to each other,
    wherein the first sub-driver comprises a first magnet disposed on the movable frame and a first coil disposed on the fixed frame, and
    wherein the second sub-driver comprises a second magnet disposed on the movable frame and a second coil disposed on the fixed frame.

5. The actuator of claim 4, wherein at least one of the first magnet and the second magnet comprises a plurality of magnets spaced apart from each other in a direction perpendicular to a direction in which the driving force is generated.

6. The actuator of claim 5, wherein a plurality of position sensors which oppose the plurality of magnets are disposed on the fixed frame.

7. The actuator of claim 4, wherein each of the first magnet and the second magnet is configured to have an N pole, a neutral region, and an S pole in order in a direction in which the driving force is generated.

8. The actuator of claim 1,
    wherein the plurality of bridges are configured to extend along a circumference of the movable portion, and
    wherein the sensor substrate comprises a first support portion configured to connect the plurality of bridges to the fixed portion, and a second support portion configured to connect the plurality of bridges to the movable portion.

9. The actuator of claim 8, wherein the first support portion and the movable portion are spaced apart from each other, and the second support portion and the fixed portion are spaced apart from each other.

10. The actuator of claim 8,
    wherein the first support portion comprises two support portions disposed opposite to each other in a first axial direction parallel to the imaging plane, and the second support portion comprises two support portions disposed opposite to each other in a second axial direction parallel to the imaging plane, and
    wherein the first axial direction and the second axial direction are perpendicular to each other.

11. The actuator of claim 9,
    wherein the movable frame comprises a first escape hole and a second escape hole which penetrate through the movable frame in a direction perpendicular to the imaging plane, and
    wherein a portion of the fixed portion and a space between the fixed portion and the second support portion are exposed through the first escape hole and the second escape hole.

12. A camera module, comprising:
    a housing having an internal space;
    a lens module accommodated in the internal space and configured to move in an optical axis direction;
    a fixed frame fixed to, and disposed on, the housing;
    a movable frame configured to move relative to the fixed frame in a direction perpendicular to the optical axis and configured to rotate about the optical axis;
    a first ball member disposed between the fixed frame and the movable frame, and configured to support a movement of the movable frame;
    a first driver disposed on the movable frame and the fixed frame, and configured to provide a driving force to the movable frame; and
    a sensor substrate on which an image sensor is disposed, and comprising a movable portion coupled to the movable frame, a fixed portion coupled to the fixed frame, and a plurality of bridges movably supporting the movable portion.

13. The camera module of claim 12,
    wherein the first driver comprises a first sub-driver configured to generate a driving force in a first axial direction perpendicular to the optical axis, and a second sub-driver configured to generate a driving force in a second axial direction perpendicular to both the optical axis and the first axis,
    wherein at least one of the first sub-driver and the second sub-driver comprises a plurality of magnets spaced apart from each other in a direction perpendicular to a direction in which driving force is generated, and wherein a plurality of position sensors which oppose the plurality of magnets are disposed on the fixed frame.

14. The camera module of claim 12,
wherein the plurality of bridges are configured to extend along a circumference of the movable portion, and wherein the sensor substrate comprises a first support portion configured to connect the plurality of bridges to the fixed portion, and a second support portion configured to connect the plurality of bridges to the movable portion.

15. The camera module of claim 14,
wherein the first support portion and the movable portion are spaced apart from each other, and the second support portion and the fixed portion are spaced apart from each other, and wherein the first support portion comprises two support portions disposed opposite to each other in a first axial direction perpendicular to the optical axis, and the second support portion comprises two support portions disposed opposite to each other in a second axial direction perpendicular to both the optical axis and the first axis.

16. The camera module of claim 15,
wherein the movable frame comprises a first escape hole and a second escape hole which penetrate through the movable frame in the optical axis direction, and wherein a space between the fixed portion and the second support portion is exposed through the first escape hole and the second escape hole.

* * * * *